(12) United States Patent
Lee et al.

(10) Patent No.: US 10,067,015 B2
(45) Date of Patent: Sep. 4, 2018

(54) TORQUE SENSOR DEVICE

(71) Applicant: LS AUTOMOTIVE CORP, Ansan-si, Gyeonggi-do (KR)

(72) Inventors: Won Yong Lee, Seoul (KR); Yeong Woon Cho, Gwangmyeong-si (KR); Seong Ik Kim, Gyeongsan-si (KR); Se Hwan Kim, Cheonan-si (KR); Yu Chan Kim, Ansan-si (KR); Kon Ho Park, Anyang-si (KR)

(73) Assignee: LS AUTOMOTIVE TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/506,772

(22) PCT Filed: Aug. 26, 2015

(86) PCT No.: PCT/KR2015/008940
§ 371 (c)(1),
(2) Date: Feb. 27, 2017

(87) PCT Pub. No.: WO2016/032236
PCT Pub. Date: Mar. 3, 2016

(65) Prior Publication Data
US 2017/0254710 A1    Sep. 7, 2017

(30) Foreign Application Priority Data

Aug. 28, 2014  (KR) .................. 10-2014-0112897
Aug. 28, 2014  (KR) .................. 10-2014-0112901
Aug. 29, 2014  (KR) .................. 10-2014-0114374

(51) Int. Cl.
*G01L 3/00* (2006.01)
*G01L 3/10* (2006.01)
*B62D 15/02* (2006.01)

(52) U.S. Cl.
CPC ............ *G01L 3/101* (2013.01); *B62D 15/021* (2013.01)

(58) Field of Classification Search
CPC ............................ B62D 15/021; G01L 3/101
(Continued)

(56) References Cited

U.S. PATENT DOCUMENTS

2010/0244606 A1    9/2010  Kim
2013/0220030 A1*   8/2013  Nishikawa .............. G01L 3/101
                                                              73/862.331

(Continued)

FOREIGN PATENT DOCUMENTS

KR    10-2009-0004289 A    1/2009
KR    10-2010-0000986 A    1/2010
(Continued)

*Primary Examiner* — Max Noori
(74) *Attorney, Agent, or Firm* — Rabin & Berdo, P.C.

(57) ABSTRACT

The present invention provides a torque sensor device disposed between an input shaft and an output shaft and configured to detect a torque between the input shaft and the output shaft through a relative rotation displacement therebetween. The torque sensor device includes: a housing configured to accommodate an end of the input shaft and an end of the output shaft and fixed in position to be able to perform a relative rotation with respect to the input shaft and the output shaft: a magnet unit accommodated in the housing and including a magnet ring connected to one end of one of the input shaft and the output shaft so as to be rotatably accommodated in the housing; a collector unit fixed in position to the housing in such a manner as to be disposed at the outside of the magnet unit, and configured to focus a magnetic field generated from the magnet unit; a sensing unit including a torque sensor disposed at the outer circumference of the collector unit and configured to detect the magnetic field focused by the collector unit; and a shield ring unit interposed between the collector unit and the magnet (Continued)

unit in such a manner as to be connected to one end of the other of the input shaft and the output shaft, and configured to change the magnetic field from the magnet unit, which is focused by the collector unit, by means of the relative rotation between the input shaft and the output shaft.

18 Claims, 41 Drawing Sheets

(58) Field of Classification Search
USPC .................................................. 73/862.328
See application file for complete search history.

(56) References Cited

U.S. PATENT DOCUMENTS

| 2014/0174202 | A1* | 6/2014 | Yukimura | ............... | G01L 3/104 |
| | | | | | 73/862.193 |
| 2015/0040686 | A1* | 2/2015 | Maehara | ................ | B62D 15/02 |
| | | | | | 73/862.325 |
| 2017/0254711 | A1* | 9/2017 | Park | ........................ | G01L 5/221 |

FOREIGN PATENT DOCUMENTS

| KR | 10-2010-0061877 A | 6/2010 |
| KR | 20-2010-0006435 U | 6/2010 |
| KR | 10-2010-0104993 A | 9/2010 |
| KR | 10-2010-0105990 A | 10/2010 |
| KR | 10-2010-0108729 A | 10/2010 |
| KR | 10-2011-0101279 A | 9/2011 |
| KR | 10-2012-0014780 A | 2/2012 |
| KR | 10-2013-0016950 A | 2/2013 |
| KR | 10-2013-0098691 A | 9/2013 |

* cited by examiner (a)

(b)

TORQUE SENSOR DEVICE

TECHNICAL FIELD

The present invention relates to a torque sensor, and more particularly, to a torque sensor for detecting a torque applied to a shaft including an input shaft and an output shaft.

BACKGROUND ART

In general, a vehicle wheel which is in contact with a road surface rotates according to a rotation of a steering wheel during traveling or stopping of a vehicle. In other words, when the steering wheel rotates to the left or right, the vehicle wheel rotates in the same direction as the rotation direction of the steering wheel. However, because the vehicle wheel is in contact with the road surface, there may be a problem that rotation amounts of the steering wheel and the vehicle wheel become different with each other due to a friction generated between the vehicle wheel and the road surface. For this reason, a driver needs a large force to manipulate the steering wheel.

The vehicle includes a power steering (PS) system as a steering force auxiliary device. In the power steering system, the coverage of an EPS scheme using an electric motor is being expanded in a passenger vehicle used in a real life.

For the purpose of power assistance, the power steering system is provided with a torque sensor that measures a deviation in the rotation angle between an input shaft side connected to the steering wheel and an output shaft side connected to the vehicle wheel in order to detect a torque load between the both shafts.

The torque sensor is largely divided into a contact type and a contactless type. Because the contact type entails a problem in that a noise is generated and durability is reduced, the contactless type has been preferred recently. In addition, the contactless type torque sensor is roughly classified into a magnetic resistance detection type, a magnetic deformation detection type, a capacitance detection type, and an optical detection type.

Meanwhile, a conventional magnetic resistance detection type torque sensor, which is provided in an electric power steering system, includes an input shaft whose upper end is coupled to the steering wheel manipulated by a driver and an output shaft whose upper end is coupled to a lower end of the input shaft through a torsion bar. A lower end of the output shaft is connected to a vehicle wheel. The lower end of the input shaft including the torsion bar and the upper end of the output shaft are covered by a housing, which has accommodated therein the torque sensor and the power means as described above. In this case, the input shaft includes a permanent magnet where magnetic polarities are alternately arranged at regular intervals. Also, the output shaft is provided with a detection ring having a gear structure of which number of polarities correspond to the number of polarities of the permanent magnet and which is made of a ferromagnetic substance that can generate a magnetic induction caused by the permanent magnet included in the input shaft. The detection ring is constructed such that a sensor for detecting magnetism is connected thereto. In this case, a relative twist between the permanent magnet provided at the input shaft and the detection ring of the gear structure provided at the output shaft causes a change in area by which the permanent magnet and the detection ring face each other.

Accordingly, a magnetic flux is changed in the detection ring and the change of the magnetic flux is detected by the sensor so that a twist angle of the output shaft relative to the input shaft can be detected.

However, the conventional contactless type torque sensor encounters problems in that an excessive number of constituent elements are required and an assembly process is complicated, thus leading to increases in the possibility of erroneous operation and the manufacturing cost, and to an exposure of a problem associated with durability period of the torque sensor due to the excessive number of constituent elements.

DISCLOSURE OF INVENTION

Technical Problem

Accordingly, the present invention has been made to solve the above-mentioned problems occurring in the prior art, and it is an object of the present invention to provide a torque sensor which can be manufactured with a simple structure, can increase sensitivity and detection reliability, and can reduce the manufacturing cost.

Technical Solution

To achieve the above object, in one aspect, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit accommodated in the housing and including a magnet ring connected to one end of one of the input shaft and the output shaft so as to be rotatably accommodated in the housing; a collector unit fixed in position to the housing in such a manner as to be disposed at the outside of the magnet unit, and configured to focus a magnetic field generated from the magnet unit; a sensing unit including a torque sensor disposed at the outer circumference of the collector unit and configured to detect the magnetic field focused by the collector unit; and a shield ring unit interposed between the collector unit and the magnet unit in such a manner as to be connected to one end of the other of the input shaft and the output shaft, and configured to change the magnetic field from the magnet unit, which is focused by the collector unit, by means of the relative rotation between the input shaft and the output shaft, wherein the shield ring unit includes: a shield ring body disposed inside the collector unit and configured to accommodate the magnet unit therein in a relatively rotatable manner; and one or more shield ring pieces arranged on the outer circumference of the shield ring body in such a manner as to be spaced apart from one another at predetermined intervals.

In the torque sensor device, the shield ring body may include a shield sleeve provided at one side thereof, and the shield sleeve may be connected to one end of the input shaft.

In the torque sensor device, the shield sleeve may include a sleeve shaft connected to one end of the input shaft and a sleeve peripheral part formed to extend outwardly radially from a lower end of the sleeve shaft. The sleeve peripheral part may include one or more plurality of grooves formed along the outer circumferential edge thereof.

In the torque sensor device, the shield ring body comprises a shield body. The shield body may include: a shield body rounder connected to the shield sleeve; and a shield body holder connected to the shield body rounder to allow the shield ring pieces to be accommodatingly mounted thereon.

In the torque sensor device, the shield body rounder may include one or more shield body rounder seating parts to allow one ends of the shield ring pieces to be seated thereon, and the shield body holder may include one or more ring piece through-openings formed thereon, each of the inner walls of the ring piece through-openings comprising a ring piece seating part formed thereon to seatingly support the other ends of the shield ring pieces.

In the torque sensor device, each of the shield ring pieces may include: a ring piece body disposed at the shield body holder ring piece seating part so as to be substantially perpendicular to a radial direction of the shield ring unit; and a ring piece connection part disposed to extend inwardly from an end of the ring piece body and seated in the shield body rounder seating part.

In the torque sensor device, the ring piece connection part may include a ring piece connection mounting part formed penetratingly thereon. The shield body rounder seating part may include a seating groove formed on one side thereof to allow the ring piece connection part to be seatingly accommodated therein, and a seating fusion protrusion formed on one side of the seating groove so as to be inserted into the ring piece connection mounting part.

In the torque sensor device, the shield body holder ring piece seating part may include a ring piece seating align guide inclinedly formed as a dovetail structure on the inner side of the ring piece through-opening so as to be oriented toward the center axis of the shield body holder.

In the torque sensor device, the shield body holder ring piece seating part may include a ring piece seating stopper formed at an end thereof, which is substantially perpendicular to the rotary shaft of the shield body holder to support an end of the shield ring piece.

In the torque sensor device, the ring piece body may include a ring piece guide formed on an end thereof, and the ring piece seating stopper may include a ring piece guide counterpart formed on one side thereof so as to be engageable with the ring piece guide.

In the torque sensor device, the shield ring unit may include a shield ring over-body coupled to the shield ring body and configured to fixedly support the shield ring pieces mounted on the shield ring body.

In the torque sensor device, the shield ring body may include a shield sleeve provided at one side thereof, and the shield sleeve may be connected to one end of the input shaft. The shield sleeve may be insert-molded with the shield ring body, and the shield ring over-body may be formed by over-molding an end of the shield ring body on which the shield ring pieces are mounted.

To achieve the above object, in another aspect, the present invention provides a torque sensor device disposed between an input shaft and an output shaft and configured to detect a torque between the input shaft and the output shaft through a relative rotation displacement therebetween, the torque sensor device including: a housing configured to accommodate an end of the input shaft and an end of the output shaft and fixed in position to be able to perform a relative rotation with respect to the input shaft and the output shaft: a magnet unit accommodated in the housing and including a magnet ring connected to one end of one of the input shaft and the output shaft so as to be rotatably accommodated in the housing; a collector unit fixed in position to the housing in such a manner as to be disposed at the outside of the magnet unit, and configured to focus a magnetic field generated from the magnet unit; a sensing unit including a torque sensor disposed at the outer circumference of the collector unit and configured to detect the magnetic field focused by the collector unit; and a shield ring unit interposed between the collector unit and the magnet unit in such a manner as to be connected to one end of the other of the input shaft and the output shaft, and configured to change the magnetic field from the magnet unit, which is focused by the collector unit, by means of the relative rotation between the input shaft and the output shaft, wherein the sensing unit further includes an angular sensor module configured to detect a rotation displacement at the output shaft in cooperation with the rotation of the shield ring unit, wherein the angular sensor module includes: an angular sensor disposed so as to be fixed in position to the housing; an angular magnet disposed at the angular sensor in a relatively rotatable manner; an angular rotor on which the angular magnet is fixedly mounted; and an over body angular gear disposed on the shield ring unit that is tooth-engaged with the angular rotor.

In the torque sensor device, the angular sensor module may include an angular holder disposed at the housing and configured to guide and support the rotation of the angular rotor, and the angular holder may be opened at one side thereof to allow the angular rotor to be rotatably accommodated therein.

In the torque sensor device, the angular rotor may include: a rotor body on which the angular magnet is mounted; a rotor gear disposed on the outer circumferential edge of the rotor and tooth-engaged with the over body angular gear; and a rotor guide formed protrudingly from the rotor body in the longitudinal direction of a rotary shaft of the rotor body.

In the torque sensor device, the angular holder may include: an angular holder accommodating part formed as a space that can accommodate the rotor gear without any interference upon the rotation of the rotor body; an angular holder guide configured to support the rotor guide in a relatively rotatable and surface contactable manner to correspond to the rotor guide; an elastic accommodating part disposed at an opposite side to the opened one side of the angular holder; and an angular holder elastic part accommodatingly supported at one end thereof by the elastic accommodating part and supported at the other end thereof by the housing to provide an elastic support force to the angular holder.

In the torque sensor device, the number of each of the angular magnet and the angular sensor provided is at least two.

In the torque sensor device, the angular holder guide and the rotor guide may be disposed to correspond to each other in such a manner as to form a pair in the longitudinal direction of a rotary shaft of the rotor body.

In the torque sensor device, the pair formed by the angular holder guide and the rotor guide may have dimensions that are different from each other.

In the torque sensor device, the angular holder guide and the rotor guide may include inclined faces that correspond to each other, and normal lines of the inclined faces may intersect each other toward the center of the rotary shaft of the angular rotor.

In the torque sensor device, the angular rotor may include: a rotor body on which the angular magnet is mounted; a rotor gear disposed on the outer circumferential edge of the rotor and tooth-engaged with the over body angular gear;

and a rotor guide formed protrudingly from the rotor body in the longitudinal direction of a rotary shaft of the rotor body, and wherein the rotor body comprises a rotor body accommodating part configured to accommodate the angular magnet and including a rotor body accommodating part stopper for preventing the escape of the angular magnet from the rotor body.

To achieve the above object, in still another aspect, the present invention provides a torque sensor device including: a sensing unit including a torque sensor configured to detect a change in the magnetic field generated by the rotation of a magnet unit, the magnet unit being accommodated in the housing and including a magnet ring connected to one end of one of the input shaft and the output shaft so as to be rotatably accommodated in the housing; and a shield ring unit rotatably connected to one end of the other of the input shaft and the output shaft between the magnet ring and the torque sensor, and configured to change a path of the magnetic field from the magnet unit, wherein the shield ring unit comprises: a shield ring body disposed inside the collector unit and configured to accommodate the magnet unit therein in a relatively rotatable manner; and one or more shield ring pieces arranged on the outer circumference of the shield ring body in such a manner as to be spaced apart from one another at predetermined intervals, and wherein the shield ring pieces are flat pieces.

In the torque sensor device, the shield ring body may include a shield sleeve provided at one side thereof so as to be connected to one end of the input shaft. The shield ring body may include a shield body, wherein the shield body may include: a shield body rounder connected to the shield sleeve; and a shield body holder connected to the shield body rounder to allow the shield ring pieces to be accommodatingly mounted thereon. The shield body rounder may include one or more shield body rounder seating parts to allow one ends of the shield ring pieces to be seated thereon, and the shield body holder comprises one or more ring piece through-openings formed thereon, each of the inner walls of the ring piece through-openings including a ring piece seating part formed thereon to seatingly support the other ends of the shield ring pieces. Each of the shield ring pieces may include: a ring piece body disposed at a shield body holder ring piece seating part so as to be substantially perpendicular to a radial direction of the shield ring unit; and a ring piece connection part disposed to extend inwardly from an end of the ring piece body and seated in the shield body rounder seating part. The ring piece body may have an infinite radius of curvature.

In the torque sensor device, the shield ring body may include a shield part where the shield ring piece is arranged radially, and a shield part as a space defined between two adjacent shield parts in such a manner that a between angle α formed by the shield part and a between angle β formed by the non-shield part from the center of the shield ring body have different values.

In the torque sensor device, the between angle α formed by the shield part and the between angle β formed by the non-shield part from the center of the shield ring body of the present invention may satisfy the following relationship: β>α, and wherein the length l of an arc formed by the shield part is written as follows:

$$l = \frac{2\pi R\alpha}{m(\alpha+\beta)},$$

wherein R is a radius of the shield ring body, and m is the number of shield ring pieces.

Advantageous Effects

The torque sensor device according to the embodiments of the present invention as constructed above have the following advantageous effects.

First, the torque sensor device of the present invention can take a plurality of shield ring pieces of an insertable mounting structure to achieve automation, if necessary, through the improvement of assemblability, thereby minimizing the process cost and assembly errors and achieving the cost reduction.

Second, the torque sensor device of the present invention can minimize the generation of scraps in the process of manufacturing the shield ring pieces through an optimized structure of the shield ring pieces, thereby preventing the waste of materials and achieving the cost reduction.

Third, the torque sensor device of the present invention can prevent the escape of the plurality of shield ring pieces in a subsequent process through a heat-fusion process after the insertion of the shield ring pieces, thereby ensuring a stable assembly and manufacture process.

Fourth, the torque sensor device of the present invention can implement a stable mounting structure through the over-molding process of the shield ring body after insertion of the shield ring pieces into the shield ring body.

Fifth, the torque sensor device of the present invention can take a primary molding structure during the formation of the shield ring body in the over-molding process of the shield ring body after the insertion of the shield ring pieces into the shield ring body, and avoid the possibility of occurrence of a defect and erroneous operation due to an unwanted separation and escape or a change of constituent elements and enhance durability period to ensure reliability of products through a secondary molding structure in the over-molding process of the shield ring body after the insertion of the shield ring pieces.

Sixth, the torque sensor device of the present invention can perform a stable rotation angle detection function through the angular holder that accommodates the angular rotor of the angular sensor module.

Seventh, the torque sensor device of the present invention can allow the rotor guide to be provided at the angular rotor of the angular sensor module and allow the angular holder guide to be provided at the angular holder, and maintain a stable rotation state of the angular rotor in the angular holder through a contact guide function thereof.

Eighth, the torque sensor device of the present invention can allow the rotor guide to be disposed on both sides of the upper and lower portions of the angular rotor so as to form the outer circumferential structures that are different from each other so that a possibility of erroneous assembly in a state of being turned over and reversed can be prevented.

Ninth, the torque sensor device of the present invention can allow each of the angular sensor and the angular rotor to be provided in plural numbers, and allow the rotor guides provided at the plurality of angular rotors to have different dimensions wholly or partially to form a dimension difference between the angular rotors so that a possibility of erroneous assembly in the angular holder can be completely prevented.

Tenth, the torque sensor device of the present invention can provide the shield ring pieces of a flat piece structure, thereby achieving performance improvement through sensitivity enhancement and error reduction.

Eleventh, the torque sensor device of the present invention can further improve the output sensitivity with respect to the output twist angle range through a structure in which the lengths of arcs or the angular ranges between the shield part and the non-shield part are not equal to each other.

Twelfth, the torque sensor device of the present invention can exclude a separate rolling process, thereby significantly reducing the manufacturing cost.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
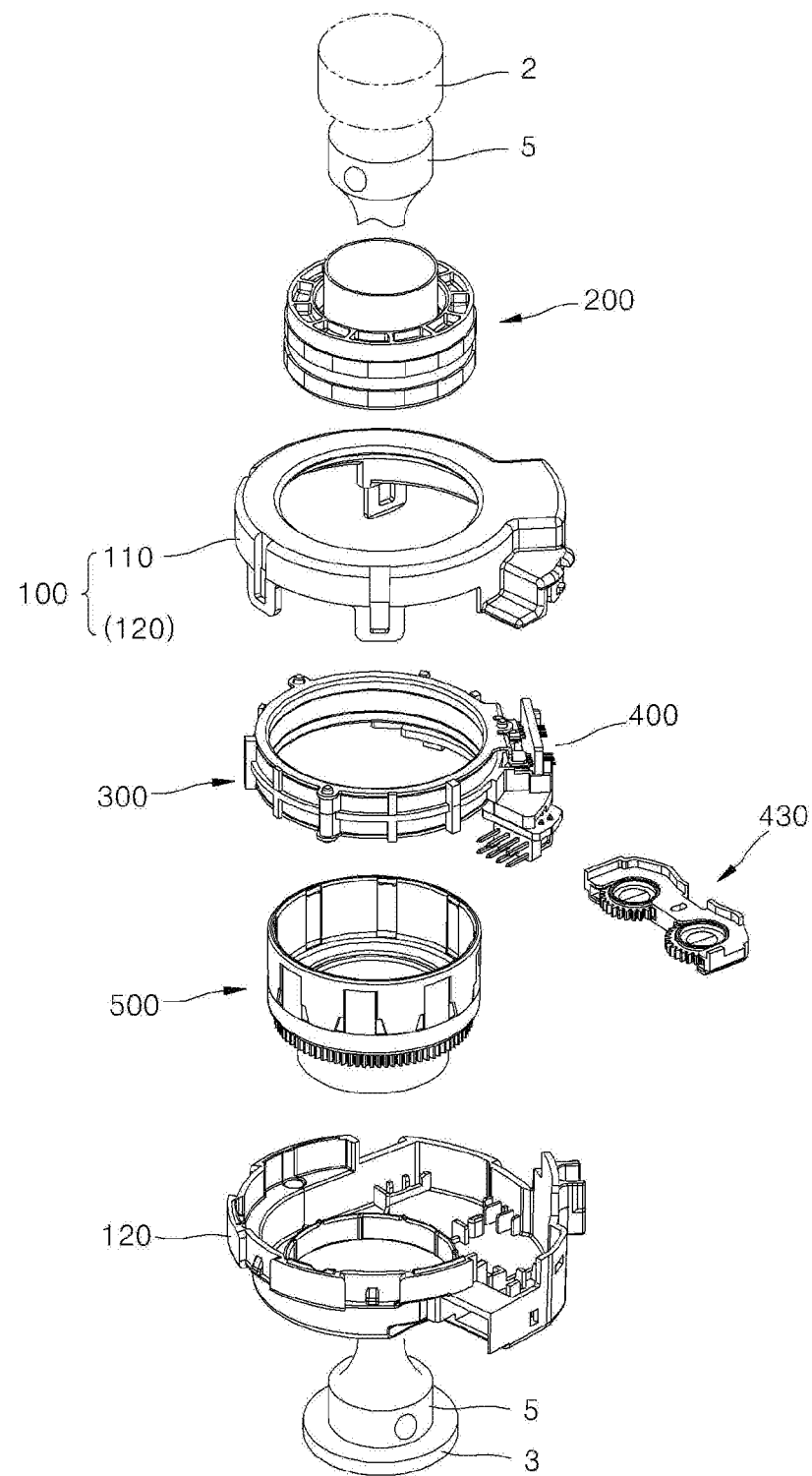
FIG. 1 is a schematic exploded perspective view showing a torque sensor device according to one embodiment of the present invention.
Figure 2:
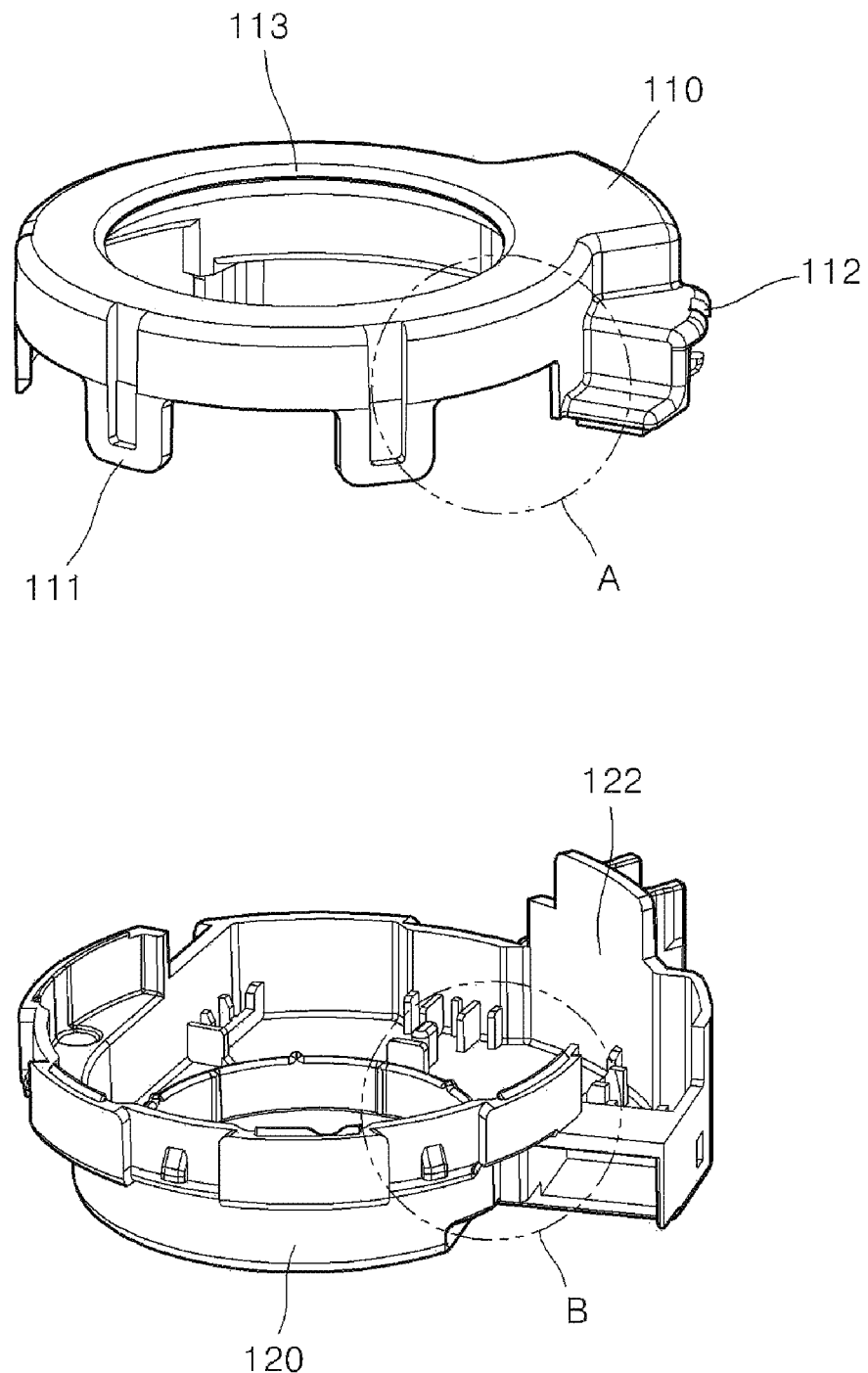
FIG. 2 is a schematic exploded perspective view showing a housing of a torque sensor device according to one embodiment of the present invention.
Figure 3:
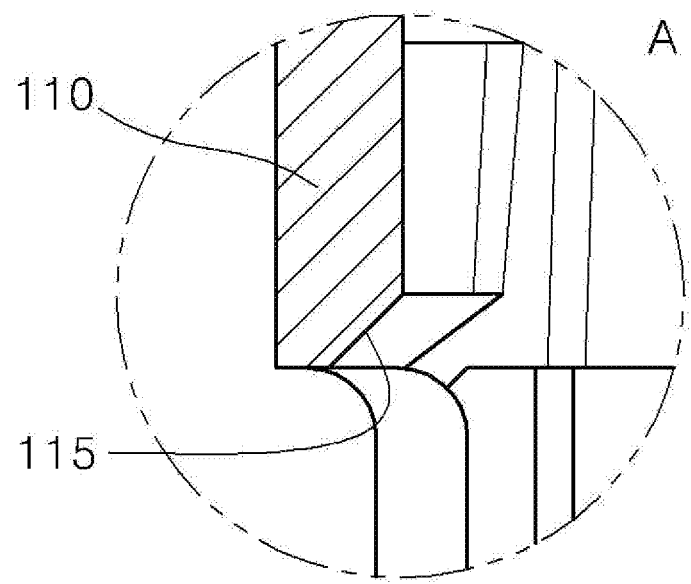
FIGS. 3 and 4 are partially enlarged schematic views showing portions "A" and "B" of a housing of a torque sensor device according to one embodiment of the present invention.
Figure 4:
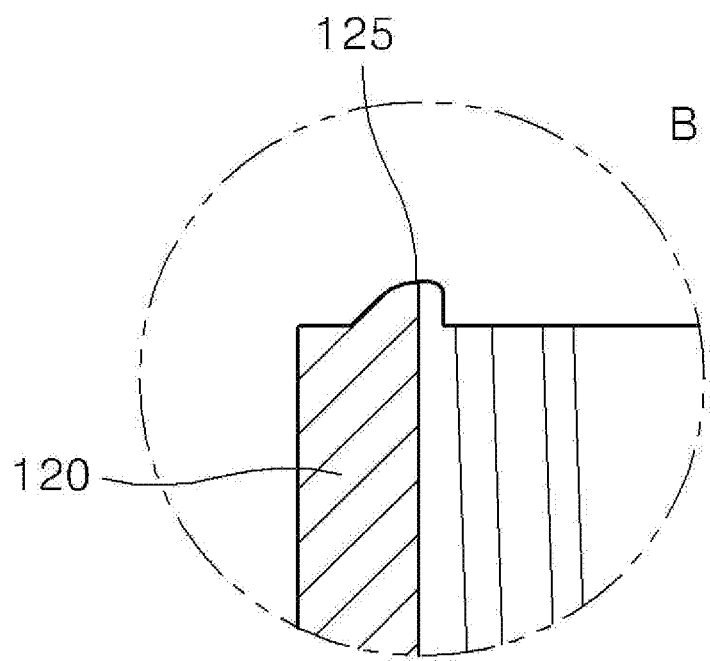

Hereinafter, the configuration and operation of a torque sensor device 10 of the present invention will be described in detail with reference to the accompanying drawings.

The torque sensor device 10 of the present invention includes a housing 100, a magnet unit 200, a collector unit 300, a sensing unit 400, and a shield ring unit 500. The torque sensor device 10 of the present invention is disposed between an input shaft 2 and an output shaft 3 and detects a torque between the input shaft 2 and the output shaft 3 through a relative rotation displacement therebetween.

The housing 100 accommodates an end of the input shaft 2 and an end of the output shaft 3 and is fixed in position to be able to perform a relative rotation with respect to the input shaft 2 and the output shaft 3.

The magnet unit 200 is accommodated in the housing and includes a magnet ring 220 connected to one end of the input shaft 2 so as to be rotatably accommodated in the housing 100.

The collector unit 300 is fixed in position to the housing in such a manner as to be disposed at the outside of the magnet unit 200, and focuses a magnetic field generated from the magnet unit 200.

The sensing unit 400 includes a torque sensor 410 disposed at the outer circumference of the collector unit 300 and detects the magnetic field focused by the collector unit 300.

The shield ring unit 500 is interposed between the collector unit 300 and the magnet unit 200 in such a manner as to be connected to one end of the output shaft 3, and changes the magnetic field from the magnet unit 200, which is focused by the collector unit 300, by means of the relative rotation between the input shaft 2 and the output shaft 3.

More specifically, the housing 100 includes a housing cover 110 and a housing base 120. The housing cover 110 is engaged with the housing base 120 to define an internal space that accommodates other constituent elements.

The housing cover 110 is disposed at the input shaft, and the housing base 120 is disposed at the output shaft 3 so as to confront the housing cover 110.

The housing cover 110 includes a housing cover mounting part 111 formed at the outer circumference thereof, and the housing base 120 includes a housing cover mounting part 121 formed at the outer circumference thereof to form a mutual engagement structure.

The housing cover 110 and the housing base 120 include a through-opening 113 and a through-opening (not shown), respectively, so that the input shaft 2 and the output shaft 3 and a torsion bar 5 for directly interconnecting the input shaft 2 and the output shaft 3 can be penetratingly disposed therein.

The housing cover 110 and the housing base 120 includes a cover extending part 112 and a base extending part 122 formed at the outside thereof, respectively, to allow a connector or the like to be disposed therein.

Meanwhile, the housing cover 110 and the housing base 120 of the present invention may further include a self-alignment function and a constituent element for reinforcing an impact resistance against an external force during the mutual engagement assembly. In other words, as shown in FIGS. 2 to 5, the housing 100 further includes a slope guide part (115, 125).

The slope guide part (115, 125) is disposed at an end where the housing cover 110 and the housing base 120 abut against each other.

The slope guide part (115, 125) includes a cover guide 115 and a base guide 125. The cover guide 115 is disposed at an end of the housing cover 110 so as to oriented toward the housing base 120, and the base guide 125 is disposed at an end of the housing base 120 so as to be opposed to the cover guide 115.

Figure 5:
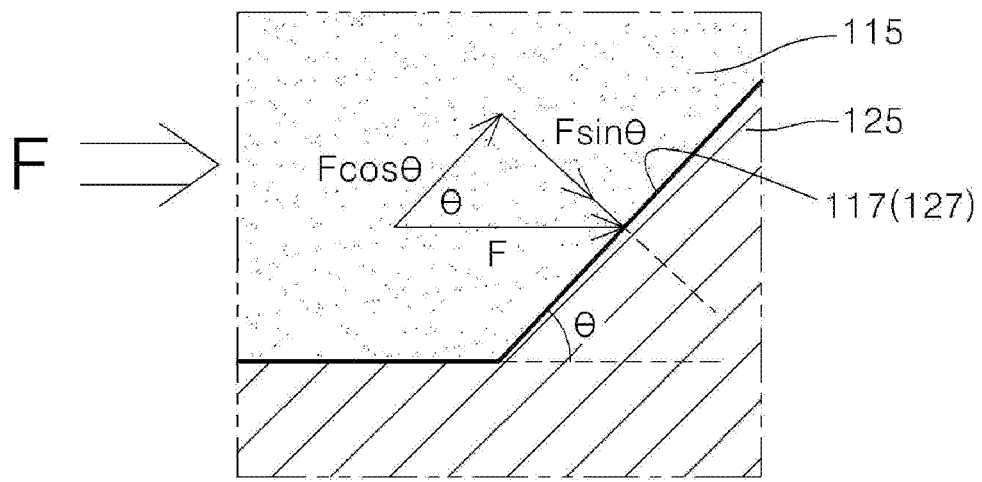
FIG. 5 is a schematic partial diagram showing an external force counteracting state of a cover guide and a base guide of a housing of torque sensor device according to one embodiment of the present invention.
Figure 6:
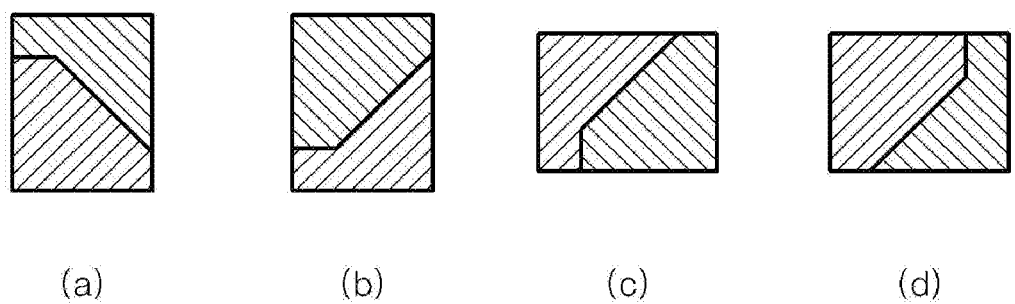
FIG. 6 shows schematic partial state diagrams of one examples of a cover guide and a base guide of a torque sensor device according to one embodiment of the present invention housing.

The cover guide 115 includes an inclined face 117 and the base guide 125 includes an inclined face 127. The inclined face 117 and the inclined face 127 takes a structure in which they abut against each other to form a surface contact. As shown in FIG. 5, when an external force F is applied to the housing 100, the inclined faces 117 and 127 where the cover guide 115 and the base guide 125 abut against each other form a predetermined angle θ with respect to a segment oriented radially from the center of the housing, i.e., a horizontal line on the drawing sheet. An external force F transmitted to the inclined faces 117 and 127 is formed as F sin θ so that a pressure distribution effect for the contact area of the inclined faces 117 and 127 can be achieved, and thus the external force can be distributed through the slop guide part (115, 125) of a triangular slope structure to reinforce an impact resistance against an unwanted external force, i.e., an impact.

The slope guide part (115, 125) may form a structure in which it is disposed in plural numbers to form a plurality of pairs so that the cover guide 115 and the base guide 125 can be engaged with each other to be opposed to each other.

Although an external impact occurs from a side due to a uniform pressure distribution for the external force, a stable impact resistance can be secured through the plural arrangement on the circumference of the slope guide part (115, 125). In addition, the self-alignment function may be performed through an inclined face structure to carry out a function of guiding the assembly position stably.

In this case, a plurality of slope guide part (115, 125) may all form the same structure, but in some cases, the slope guide part (115, 125) may take different structures, for example, a structure in which inclined faces formed at at least two slope guide parts, i.e., two pairs of cover guide 115 and the base guide 125 intersect differently from each other from the center of the housing 100. In other words, as shown in FIGS. 6(a) to 6(d), the slope guide part may take a structure in which the inclined faces are formed in a different manner or the arrangement positions of a vertical or horizontal contact pat are formed differently from each other. Like this, at least two pairs of the cover guide and the base guide may form structures different from each other so as to avoid a risk of erroneous assembly.

Figure 7:
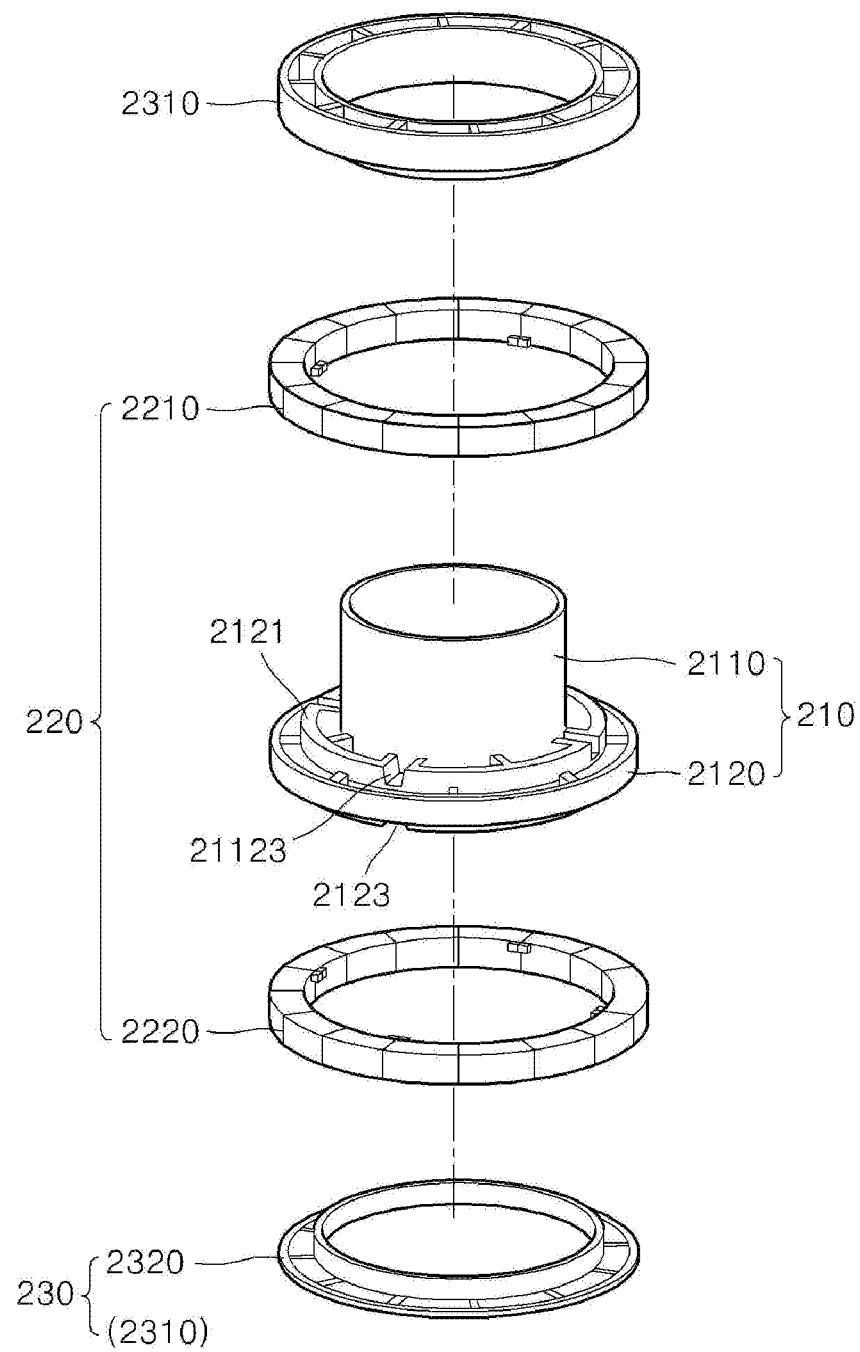
FIG. 7 is a schematic exploded perspective view showing a magnet unit of a torque sensor device according to one embodiment of the present invention.
Figure 8:
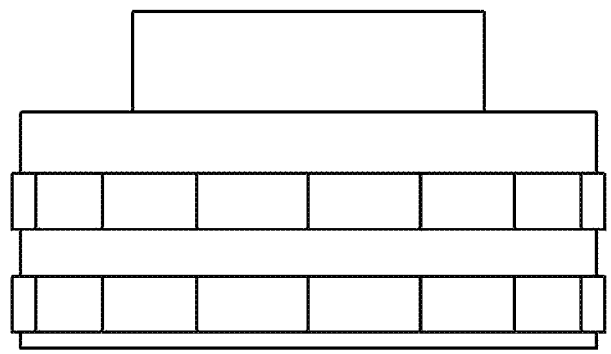
FIG. 8 is a schematic side view showing a magnet unit of a torque sensor device according to one embodiment of the present invention.
Figure 9:
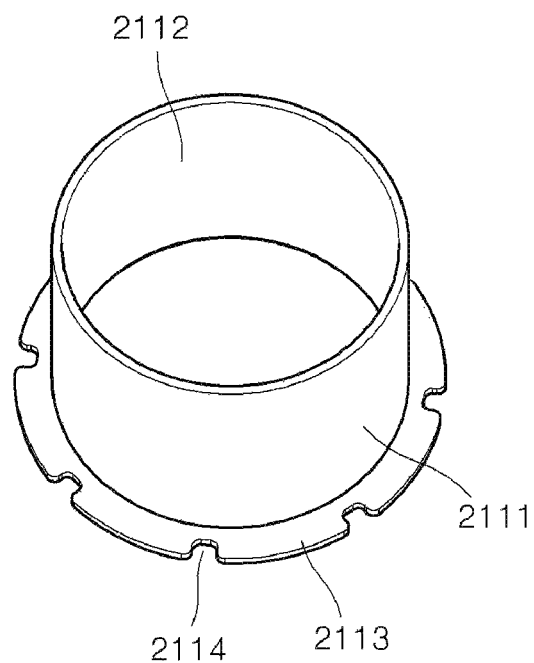
FIG. 9 is a schematic perspective view showing a magnet holder shaft of a torque sensor device according to one embodiment of the present invention.
Figure 10:
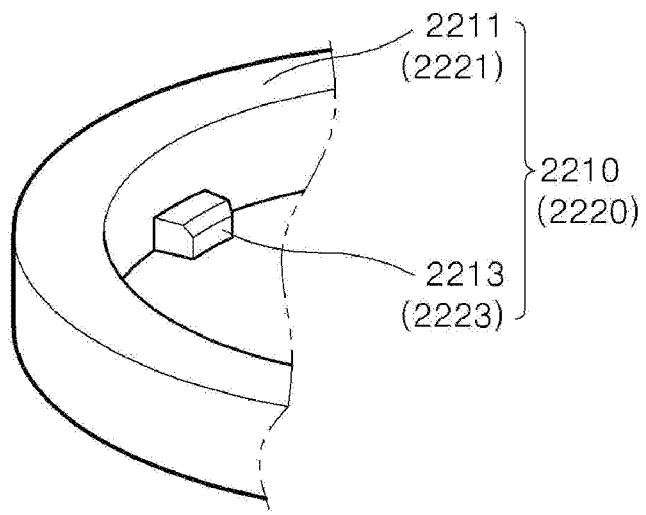
FIG. 10 is a schematic partial perspective view showing a magnet ring of a torque sensor device according to one embodiment of the present invention.
Figure 11:
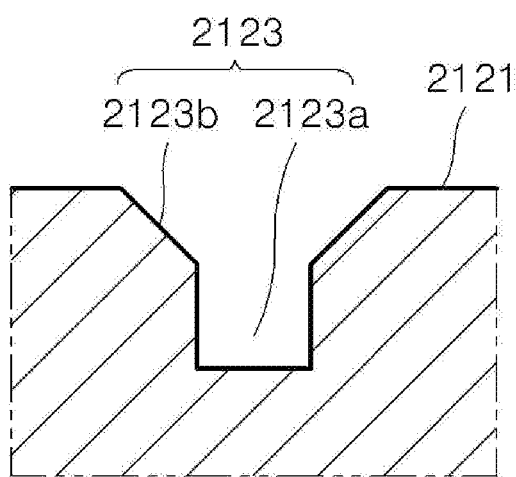
FIG. 11 is a schematic partial cross-sectional view showing a holder base body fit of a magnet holder base of a torque sensor device according to one embodiment of the present invention.

The magnet unit 200 (see FIG. 7) is accommodated in the housing 100, and includes a magnet ring 220 connected to one end of the input shaft 2 so as to be rotatably accommodated in the housing 100 as described above. The magnet unit 200 includes a magnet holder 210, a pair of magnet rings 220, a magnet cover 230, and a magnet buffer 240.

The magnet holder 210 is connected at one end thereof to the input shaft 2, the magnet rings 220 are disposed so as to be spaced apart from each other with the magnet holder 210 interposed therebetween, the magnet cover 230 is formed in such a manner that the magnet ring 220 is disposed between the magnet cover 230 and the magnet holder 210 so as to be connected to the magnet holder 210. The magnet buffer 240 is disposed between the magnet cover 230 and the magnet ring 220 to perform a buffer function between the magnet cover 230 and the magnet ring 220.

The magnet holder 210 includes a magnet holder shaft 2110 and a magnet holder base 2120. The magnet holder shaft 2110 is connected at one end thereof to the input shaft 2. The magnet holder shaft 2110 at least has a cylindrical structure at a portion connected to the input shaft 2. The magnet holder base 2120 is disposed at the other end of the magnet holder shaft 2110, and the magnet rings 220 are disposed at both sides of the magnet holder base 2120.

In this embodiment, the magnet holder shaft 2110 may be made of a material such as austenitic stainless steel in order to secure rigidity that maintains a stable connection state with the input shaft 2, but various materials can be selected within a range of securing a predetermined rigidity. The magnet holder shaft 2110 includes a holder shaft body 2111 and a holder shaft base 2113. The holder shaft body 2111 is formed as a cylindrical hollow structure that has a through-opening 2112 formed at the center thereof to allow the holder shaft body 2111 to be connected to the input shaft 2 therethrough and allow the torsion bar or the like 5 to penetrate therethrough. The holder shaft base 2113 is formed at the other end of the holder shaft body 2111 so as to extend radially.

In this case, the holder shaft base 2113 includes a plurality of grooves 2114 formed on the outer circumferential surface thereof so that a relative rotation between the holder shaft base 2113 and the magnet holder base 2120 can be prevented through an engagement therebetween.

The magnet ring 220 includes a ring type magnet. In this embodiment, the magnet ring 220 is formed as a multipolar magnetization structure, for example, a magnet of a structure in which polarities are alternately arranged in the order of N,S,N,S, . . . in a circumferential direction. In this embodiment, the magnet ring 220 includes a magnet upper ring 2210 and a magnet lower ring 2220. These magnet upper rings can be modified in various manners, such as taking a structure of forming the same structure as each other so that they are turned over during the mounting thereof, thereby reducing the manufacturing cost.

The magnet upper ring 2210 and the magnet lower ring 2220 include a magnet upper ring body 2211 and a magnet lower ring body 2221, respectively. The magnet upper ring body 2211 is disposed to be oriented toward the input shaft, and the magnet lower ring body 2221 is disposed to be oriented toward the output shaft.

The magnet ring 220 includes a magnet ring body fit (2213, 2223) formed on the inner circumferential surface thereof. The magnet upper ring 2210 and the magnet lower ring 2220 include a magnet upper ring body fit 2213 and a magnet lower ring body fit 2223 formed thereon, respectively. The magnet upper ring and the magnet lower ring may be manufactured in the same manner as each other and turned over during the mounting thereof to take an upper/lower structure. The magnet upper ring body fit 2213 and the magnet lower ring body fit 2223 are disposed at one sides of ends of the inner circumferential surfaces of the magnet upper and lower rings, respectively. By virtue of this structure, an unnecessary material waste is avoided and an unnecessary change in magnetic flux is minimized. In the case where the same elements are mounted at the input shaft and the output shaft, respectively, in a state of being turned over and reversed, the magnet ring may take a structure of minimizing an interference with other constituent elements.

Each of the magnet upper ring body fit and the magnet lower ring body fit may be formed of a grooved structure, but in this embodiment, is formed as a protruded structure, and can be configured in various manners within a range of forming an engagement between the magnet ring and the magnet holder.

The magnet cover 230 is formed in such a manner that the magnet ring 220 is disposed between the magnet cover 230 and the magnet holder 210 so as to be connected to the magnet holder 210. The magnet cover 230 includes a magnet upper cover 2310 and a magnet lower cover 2320. The magnet upper cover 2310 is disposed at the input shaft 2 side and the magnet lower cover 2320 is disposed at the output shaft 3 side. The magnet upper cover 2310 is engaged with one side of the magnet holder 210, which is oriented toward the input shaft 2, and the magnet lower cover 2320 is engaged with one side of the magnet holder 210, which is oriented toward the output shaft 3.

The magnet upper cover 2310 includes a magnet upper cover seating part 2311 and a magnet upper cover body 2313. The magnet upper cover seating part 2311 has a diameter larger than that of the magnet upper cover body 2313, and the magnet upper cover body 2313 has a large length in an axial direction of the magnet holder 210. The magnet upper cover seating part 2311 forms a stable accommodation structure of the magnet upper ring 2210, and the magnet upper cover body 2313 is connected to the magnet holder 210.

Similarly, the magnet lower cover 2320 includes a magnet lower cover seating part 2321 and a magnet lower cover body 2323. The magnet lower cover seating part 2321 has a diameter larger than that of the magnet lower cover body 2323, and the magnet lower cover body 2323 has a large length in an axial direction of the magnet holder 210. The magnet lower cover seating part 2321 forms a stable accommodation structure of the magnet lower ring 2220, and the magnet lower cover body 2323 is connected to the magnet holder 210.

The magnet buffer 240 is disposed between the magnet cover 230 and the magnet ring 220 to perform a buffer function between the magnet cover 230 and the magnet ring 220. The magnet buffer 240 is disposed at least one of a position between the magnet upper cover 2310 and the magnet upper ring 2210, and a position between the magnet lower cover 2320 and the magnet lower ring 2220. In this embodiment, the magnet buffer 240 is disposed at the both positions.

The magnet buffer 240 includes a magnet upper buffer 2410 and a magnet lower buffer 2420 which are respectively disposed between the magnet upper cover 2310 and the magnet upper ring 2210, and between the magnet lower cover 2320 and the magnet lower ring 2220.

The magnet buffer 240 is disposed between the contact surfaces of the magnet cover 230 and the magnet ring 220 to avoid a direct contact between the magnet cover 230 and the magnet ring 220 and perform a buffer function, thereby minimizing a damage of a constituent element due to close abutting between the magnet cover 230 and the magnet ring 220 in an assembly process. An assembly mounting structure is formed between the magnet cover and the magnet holder. In the embodiment, the magnet cover and the magnet holder form a structure in which they are connected to each other through an ultrasonic fusion process. A significant frequency of micro-vibration is generated between the magnet cover and the magnet holder and fusion occurs between the contact surfaces of the magnet cover and the magnet holder to achieve a secure engagement between the magnet cover and the magnet holder. In this process, a compression force or an impulsive force of micro-vibration caused by a relative vibration, i.e., a micro-translational motion generated between the magnet cover and the magnet holder is directly transmitted to the magnet ring 220 interposed between the magnet cover 230 and the magnet holder 210. In this process, since there is a high possibility of crack generation or damage, the magnet unit 200 of the present invention includes the magnet buffer 240 and the magnet buffer 240 is interposed between the magnet ring 220 and the magnet cover 230 so that a direct contact between the magnet ring 220 and the magnet cover 230 can be avoided and a given buffer clearance can be permitted in an axial-longitudinal direction, thereby preventing a damage of the magnet ring 220.

In addition, the magnet buffer 240 of the present invention is interposed between the magnet cover and the magnet ring, but in some cases, may be modified in various manners, such as taking a configuration in which the magnet buffer 240 is additionally provided between the magnet holder and the magnet ring.

The magnet buffer 240 of the present invention may conduct a performance maintaining function in the operation process together with an impulse reducing function by the buffer in the assembly process. For example, the magnet ring 220 and the magnet cover 230 or the magnet holder 210 have different thermal expansion coefficients due to different materials. In the case where certain heat is applied in the operation process or heat is transferred in the assembly process, it is possible to minimize a risk of release or damage that may occur when a direct contact structure is implemented due to a difference in the occupied space by different thermal expansion coefficients between the magnet ring 220 and the magnet cover 230 or the magnet holder 210.

Figure 16:
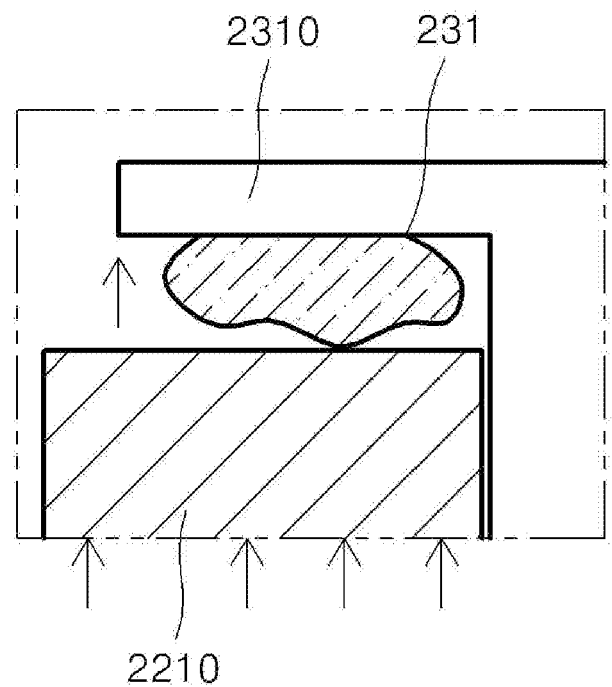
FIGS. 16 and 17 are partially enlarged side cross-sectional views showing a mounting state of a magnet buffer interposed between a magnet ring and a magnet cover of a torque sensor device according to one embodiment of the present invention.
Figure 17:
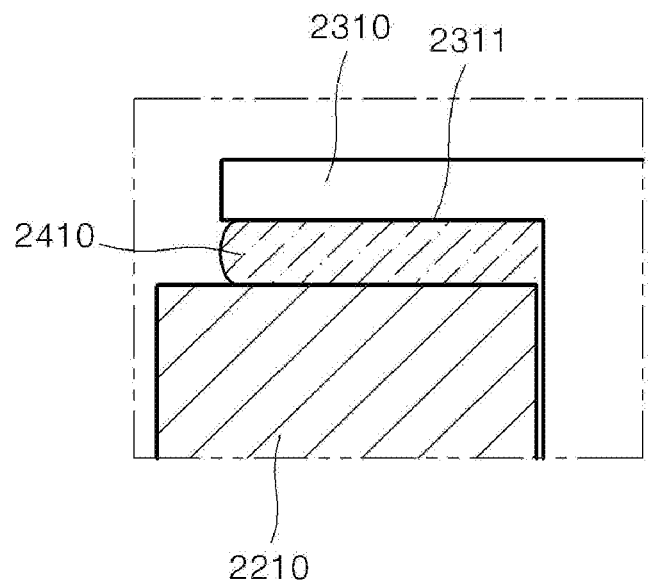

The magnet buffer 240 included in the magnet unit 200 of the present invention can select various materials within a range of preventing the damage of the magnet ring. The magnet buffer 240 according to an embodiment of the present invention is a silicon coating layer. In other words, as shown in FIGS. 16 and 17, the silicon coating layer is coated between the magnet cover 230, i.e., the magnet upper cover 2310 and the magnet upper ring 2210, and then a pressure is applied to the magnet upper cover 2310 and the magnet upper ring 2210 so that a predetermined magnet buffer 240 can be formed between the magnet upper cover 2310 and the magnet upper ring 2210. In this case, the coated silicon is formed as heat-resistant silicon so that degradation of the buffer function due to heat generation can be prevented.

Figure 18:
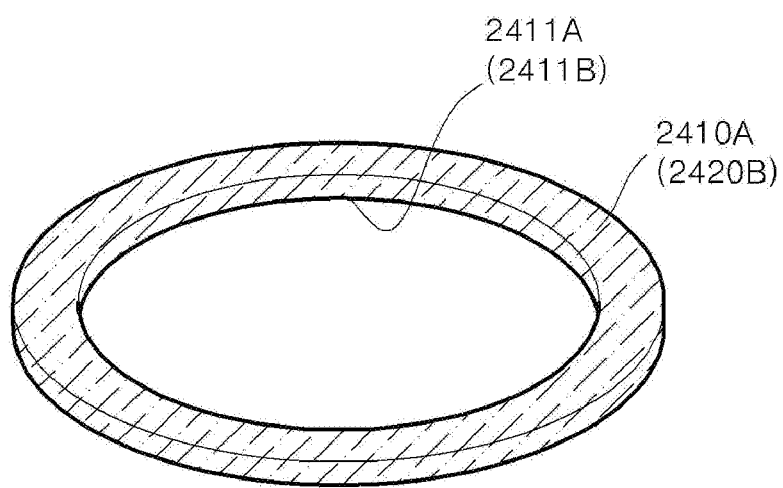
FIG. 18 is a perspective view showing another example of a magnet buffer interposed between a magnet ring and a magnet cover of a torque sensor device according to one embodiment of the present invention.

In this embodiment, the magnet buffer 240 is formed as the silicon coating layer, but may be formed as a ring type magnet buffer made of a felt paper or non-woven fabric material as shown in FIG. 18. The thickness of the felt paper or non-woven fabric can be configured in various manners depending on design specifications, and an adhesive layer may be further provided on one side or both sides of the magnet buffer.

As such, the magnet buffer can select various materials within a range of reducing an impulse by the contact between the magnet ring 220 and the magnet cover 230.

In the meantime, the magnet holder base 2120 includes a holder base body 2121 and a holder base body fit (2123; 2123-1, 2123-2, 2123-3, 2123-4). The holder base body 2121 is connected to the magnet holder shaft 2110 to integrally rotate together with the magnet holder shaft 2110. The holder base body fit (2123; 2123-1, 2123-2, 2123-3, 2123-4) is formed on one side of the holder base body 2121 so as to be engageable with the magnet ring body fit (2213, 2223) formed on the inner circumferential surface of the magnet ring 220.

The magnet ring body fit and the holder base body fit forms a structure in which they are disposed so as to confront each other to form a pair that can be engaged with each other. The pair of the magnet ring body fit and the holder base body fit may be provided in plural numbers.

As described above, the magnet ring body fit may form an accommodating groove structure, and a corresponding holder base body fit may form a protrusion structure, but in an embodiment of the present invention, the magnet ring body fit takes a protrusion structure, and the holder base body fit takes an accommodating groove structure.

In the case where the holder base body fit takes the accommodating groove structure, it may take a structure of achieving a smooth accommodation of the magnet ring body fit of the protrusion structure. That is, the holder base body fit (2123; 2123-1, 2123-2, 2123-3, 2123-4) includes an accommodation groove 2123a and a guide 2123b. The accommodation groove 2123a is formed as a recessed structure that accommodates the magnet ring body fit (2213, 2223), and the guide 2123b is formed at the outside of the accommodation groove 2123b and has a width larger than that of the accommodation groove 2123b.

By virtue of this structure, the position alignment can be performed smoothly through the engagement between the magnet ring and the magnet holder and assemblability can be improved.

The holder base body fit may be formed on both sides of the holder base body 2121, and the holder base body fit (2123 formed on both sides of the holder base body 2121 can be engaged with the magnet upper ring body fit 2213 and the magnet lower ring body fit 2223 formed respectively on the magnet upper ring and the magnet lower ring.

In this case, the holder base body fit 2123 formed respectively on both sides of the holder base body 2121 of the magnet holder base 2120 of the magnet holder may take a structure in which the holder base body fit 2123 is symmetrically disposed on both sides of the holder base body 2121, or a structure in which the holder base body fits are disposed at a between angle to have a certain preset angle (θ) with respect to each other. In the case where the holder base body fit takes the former structure, an assembly process can be simplified and clarified owing to symmetrization of the assembly position.

In addition, a press-fit structure for a smooth assembly can be formed during the mounting of the fit between the magnet holder and the magnet ring. In other words, two adjacent pairs of the magnet ring body fit (2213, 2223) and the holder base body fit that form a plurality of pairs take an intermediate press-fit structure, and the remaining pairs, i.e., the magnet ring body fit (2213-3; 2213-3, 2223-4; 2223-4) and the holder base body fit (2123-3, 2123-4) in this embodiment take a loose press-fit structure.

Figure 12:
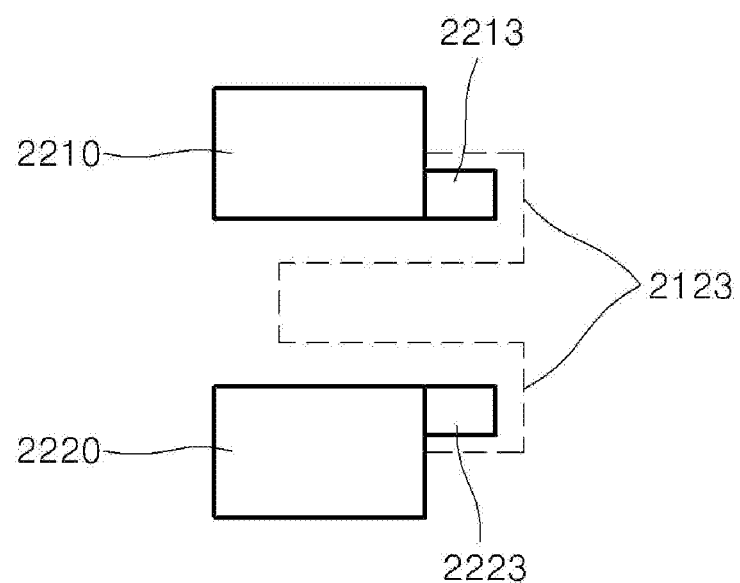
FIG. 12 is a schematic partial side cross-sectional view showing a magnet holder mounting state of a magnet ring of a torque sensor device according to one embodiment of the present invention.
Figure 13:
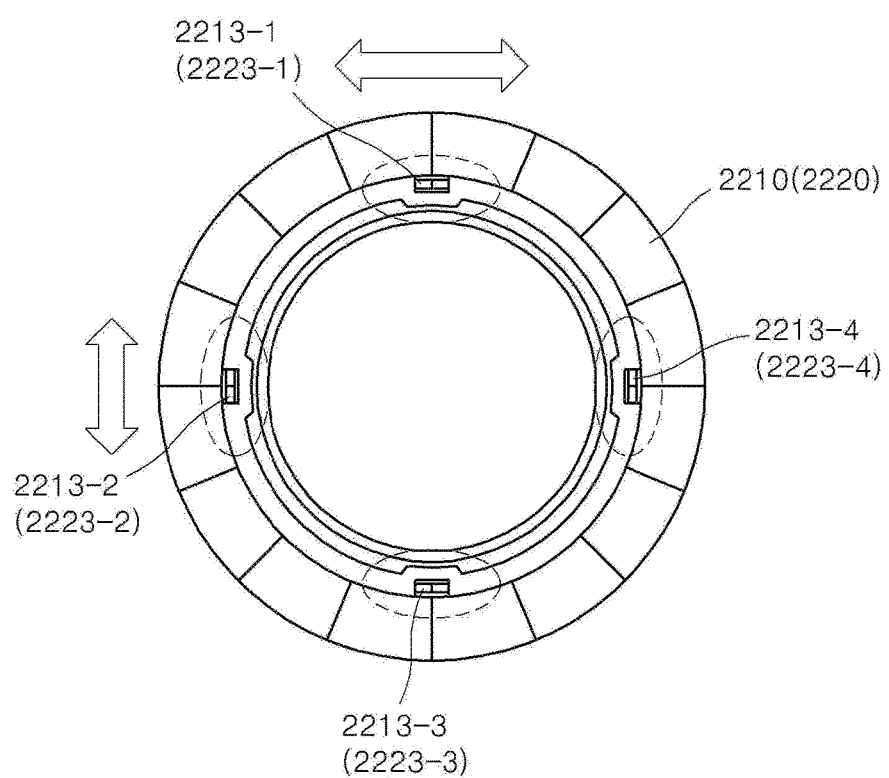
FIG. 13 is a schematic top plan view showing a press-fit state between a magnet ring and a magnet holder of a torque sensor device according to one embodiment of the present invention.
Figure 14:
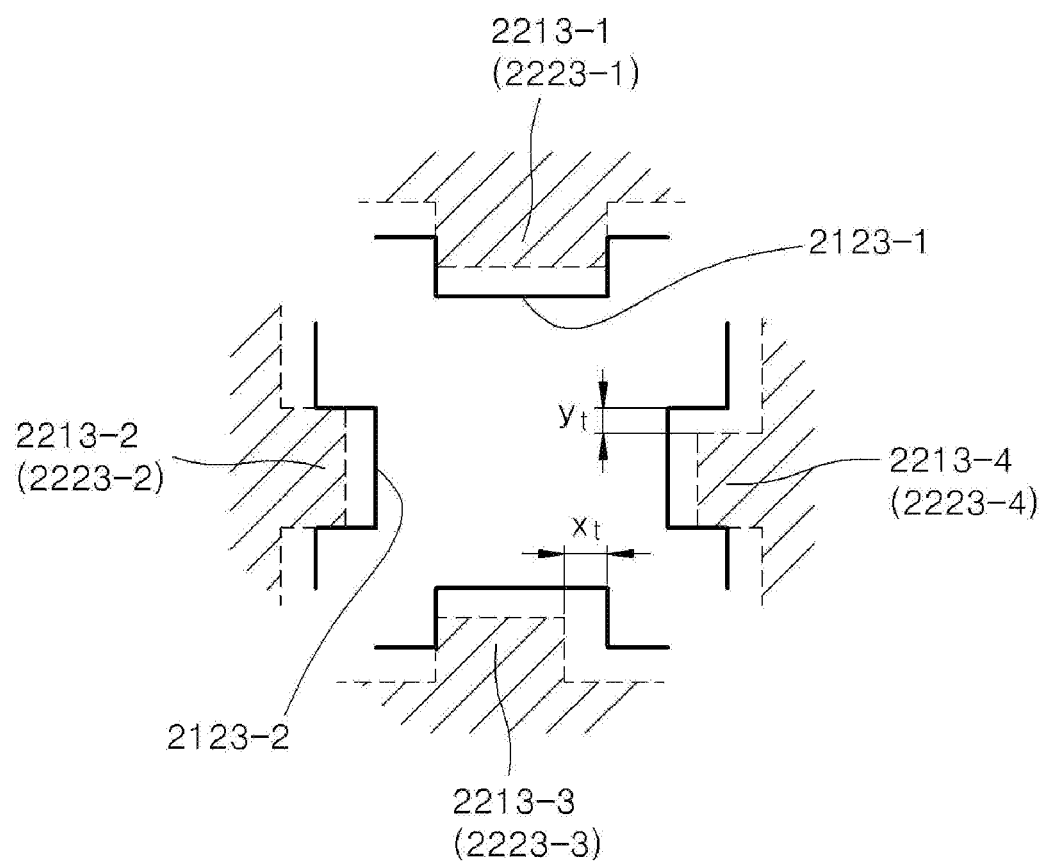
FIG. 14 is a partially enlarged top plan view schematically showing a press-fit state between a magnet ring and a magnet holder of a torque sensor device according to one embodiment of the present invention.
Figure 15:
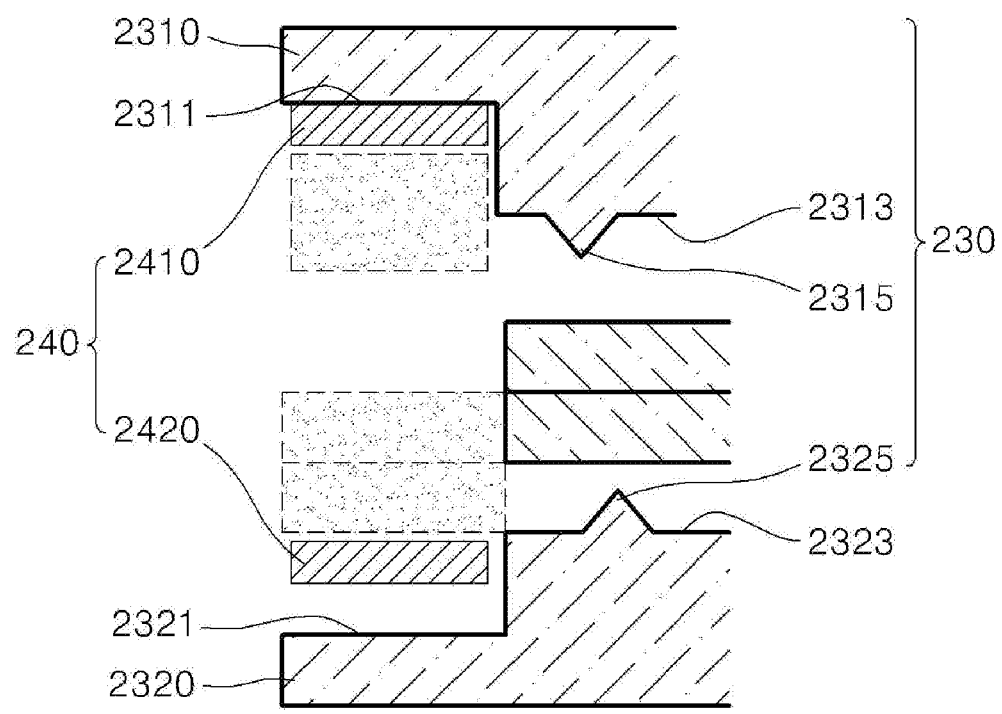
FIG. 15 is a partially enlarged side cross-sectional view schematically showing a press-fit state between a magnet ring and a magnet holder of a torque sensor device according to one embodiment of the present invention.

In other words, as shown in FIGS. 12 to 14, a clearance occur hardly between the magnet ring body fit (2213-1; 2213-2,2223-1;2223-2) and the holder base body fit (2123-1,2123-2) that take the intermediate press-fit structure, but a clearance error of xt and yt occurs in each direction between the magnet ring body fit (2213-3; 2213-3, 2223-4; 2223-4) and the holder base body fit 2123-3,2123-4) that take the loose press-fit structure. An assembly position reference can be secured through the intermediate press-fit structure at two points while excluding a complete confinement state in each direction and permitting a predetermined clearance.

In the meantime, the magnet unit 200 may take a structure in which the magnet holder and the magnet cover are assembled by means of a separate fastening element, but the present invention takes an engagement fastening structure through an ultrasonic fusion so that the magnet ring and the magnet buffer that are disposed in a between-space can be stably maintained.

As described above, the magnet upper cover body 2313 of the magnet upper cover 2310 and the magnet lower cover body 2323 of the magnet lower cover 2320 abut against the holder base body 2121 of the magnet holder base 2120 of the magnet holder 210.

A plurality of fusion protrusion 2315 and 2325 for the ultrasonic fusion is formed at at least one side of the magnet upper cover body 2313 and the magnet lower cover body 2323, and the holder base body 2121. In this embodiment, the fusion protrusions for the ultrasonic fusion are formed at the magnet upper cover body 2313 and the magnet lower cover body 2323. A magnet upper cover fusion protrusion 2315 and a magnet lower cover fusion protrusion 2325 are respectively formed at the magnet upper cover body 2313 and the magnet lower cover body 2323. During the ultrasonic micro-vibration through the ultrasonic fusion between the magnet cover 230 and the magnet holder 210, the magnet cover 230 and the magnet holder 210 are bonded to each other by heat fusion so that a secure engagement state can be formed therebetween and a position shift of the magnet ring can be prevented, The collector unit 300 of the present invention is fixed in position to the housing 100 and disposed at the outside of the magnet unit 200 so as to focus a magnetic field from the magnet unit 200. The collector unit 300 of the present invention includes a collector holder 310 and a collector 320.

The collector holder is fixed in position to the housing 100, and the collector 320 is fixed in position to the collector holder 310 so that the magnet field generated by the magnet unit 200 disposed within the collector unit 300 is transmitted to the torque sensor 410 of the sensing unit 400 disposed in proximity to the collector unit 200, and a sensor such as the torque sensor 410 detects a change in magnetic flux to detect a rotation displacement of the input shaft and the output shaft so that a torque can be calculated from the detection of the rotation displacement.

The collector unit 300 of the present invention is a collector unit of a structure that prevents thermal by excluding the inserting molding structure of the collector 320, does not require a separate fastening element, enables a rapid assembly, and ensures an excellent maintainability while minimizing a possibility of damage due to release with a resin.

The collector 320 of the present invention takes a structure in which it is respectively disposed on both circumferential ends of the collector holder 310. Two collectors 320 are respectively disposed on both circumferential ends of the collector holder 310. The collectors 320 are disposed to be spaced apart from each other in the longitudinal direction of a rotary shaft of the magnet unit with a predetermined gap. The collector 320 is formed as a predetermined ring structure and allows the magnet unit 200 to be spacedly accommodated therein in a relatively rotatable manner.

The collector 320 includes a collector ring 3210 and a collector terminal 3220. The collector ring 3210 includes a collector ring horizontal part (3211, 3221) and a collector ring vertical part (3213, 3223). The collector ring horizontal part (3211, 3221) is formed circumferentially on a plane perpendicular to the longitudinal direction of the rotary shaft of the magnet unit 200, and the collector ring vertical part (3213, 3223) is formed circumferentially to have a predetermined width in the longitudinal direction of the rotary shaft of the magnet unit 200 and is connected to an inner end of the collector ring horizontal part (3211, 3221).

The collector terminal 3220 is formed to extend from an end of one side of the collector ring horizontal part (3211, 3221) of the collector ring 3210 toward the torque sensor 410. The collector terminal 3220 may take a structure in which it is formed as a predetermined bent structure so as to minimize an air gap defined between the collector terminal and the torque sensor 410 positioned in proximity thereto.

The collector ring 320 includes a collector ring mounting part (3215, 3225) formed thereon. The collector ring mounting part (3215, 3225) is connected to the collector holder 310 side. The collector holder 310 includes a collector holder body 311 and a collector holder extending part 313. The collector holder extending part 313 may be connected to the collector holder body 311 to perform a mounting structure function for fixing the position of the torque sensor 410 of the sensing unit 400. The collector holder body 311 includes a collector holder body mounting part 3111 formed thereon to correspond to the collector ring mounting part (3215, 3225). In this embodiment, the collector holder body mounting part 3111 is formed as a protrusion structure, and the collector ring mounting part (3215, 3225) is formed as a through-hole structure. A stable engagement structure between the collector holder body 311 and the collector ring 320 can be implemented through the engagement structure between the collector holder body mounting part 3111 and the collector ring mounting part (3215, 3225).

Under the circumstances, in the case where the collector ring mounting part (3215, 3225) of the through-hole structure is provided in plural numbers, it may have different through-hole shapes so as to prevent an erroneous assembly or provide a clearance in the assembly process after securing a correct position. In other words, one of a plurality of the collector ring mounting parts is formed as a circular structure, and the other of them is formed as an elliptical structure to secure a minimum assembly position while a predetermined clearance space may be provided through the other collector ring mounting part to enable a stable assembly process.

In addition, the collector holder body 311 includes a collector holder body mounting step 3115 formed thereon. The collector holder body mounting step 3115 forms a structure in which it is formed steppedly on one side of the collector holder body 311, i.e., in this embodiment, on both sides of the collector holder body 311. The collector holder body mounting part 3111 is disposed one side of the collector holder body mounting step 3115, and a part of the collector ring 3210 is supported by abutting against one side of the collector holder body mounting step 3115 so that an at least part of the collector ring 3210 can be spacedly disposed on one side of the collector holder body 311, i.e., in this embodiment, on both sides of the collector holder body 311.

By virtue of such a surface contact restricting structure, a stress imparted to the collector ring 3210 can be minimized. In other words, in this embodiment, the collector ring 3210 is supportingly mounted on the collector holder 310 in a three-point mounting manner, and a spaced step height indicated by a reference symbol t is formed at a region other than a point of the collector holder body mounting step 3115 to minimize the surface contact so that a stress applied to the collector ring 3210, i.e., a stress caused by a difference in the thermal expansion rate, or a stress caused by a difference in a stress generated by bolt fastening in the assembly process can be minimized to ultimately constantly maintain a focusing function to constantly maintain sensitivity through the torque sensor 410.

Figure 21:
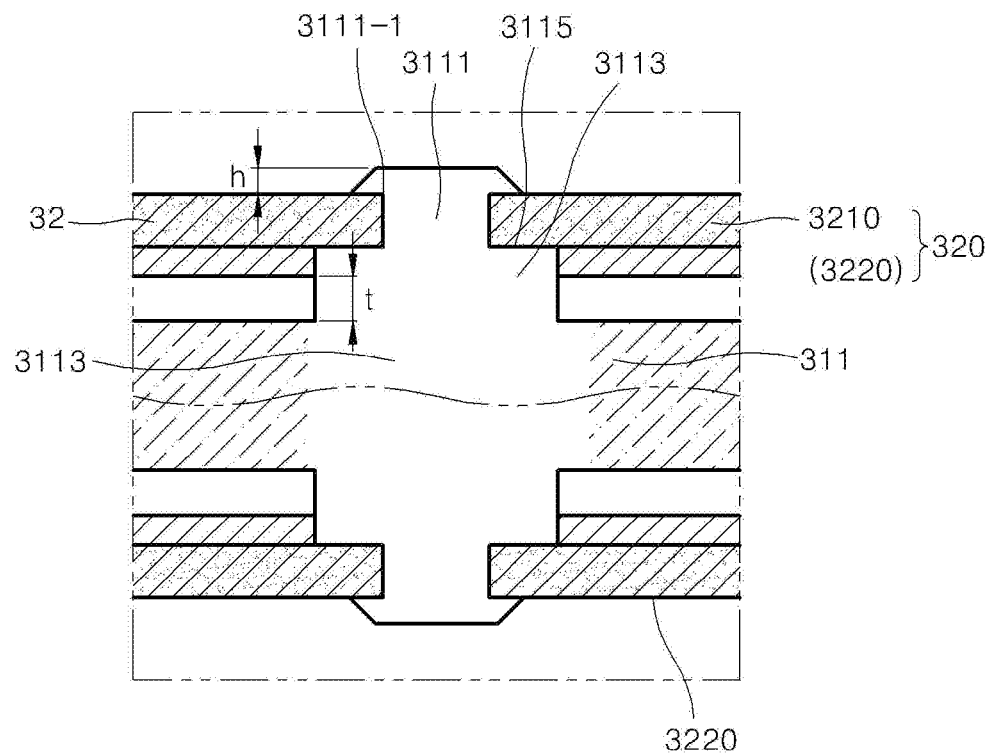
FIG. 21 is a partially enlarged side cross-sectional view schematically showing a collector unit of a torque sensor device according to one embodiment of the present invention.
Figure 22:
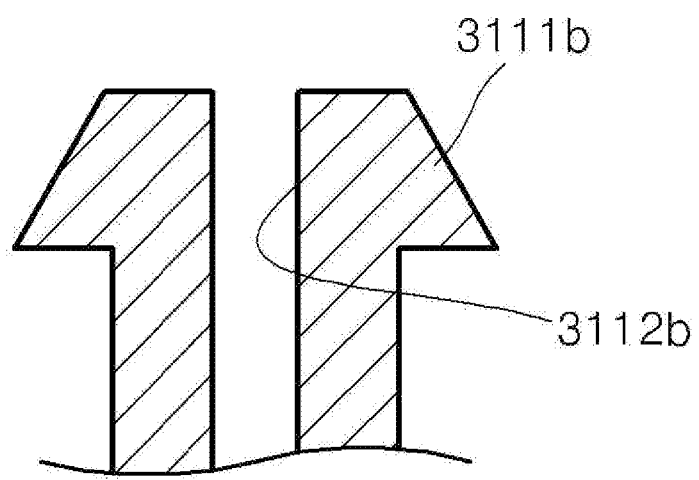
FIG. 22 is a schematic partial cross-sectional view showing a modification of a collector holder of a collector unit of a torque sensor device according to one embodiment of the present invention.

A connection structure of the collector holder body mounting part 3111 and the collector ring mounting part (3215, 3225) may take a fixing structure through caulking. That is, as shown in FIG. 21, the collector ring is mounted on the collector holder, i.e., the collector ring mounting part (3215, 3225) is insertedly fitted around the collector holder body mounting part 3111 and then the collector holder body mounting part 3111 is subjected to a caulking process (3111-1) so that a stable mounting structure of the collector ring 3210 and the collector holder 310 can be implemented, a caulking height h (see FIG. 21) can be constantly maintained even with respect to a plurality of positions through an automated process, omission of a work can be avoided, the work time can be shortened ultimately, thereby preventing a decrease in the work speed through a conventional bolt or screw fastening.

In addition, according to an embodiment of the present invention, the collector holder body 311 of the present invention may include a collector holder body mounting reinforcement part 3113 as a thicker part that has a section larger than that of an outer circumference of the collector holder body 311 at a lower portion of the collector holder body mounting step 3115 where the collector holder body mounting part 3111 is formed, to reinforce rigidity so as to prevent buckling or damage due to a degradation of rigidity in the caulking work process between the collector holder and the collector ring. Further, the collector holder body 311 may include a plurality of collector holder body ribs 315 so as to further reinforce rigidity.

Figure 23:
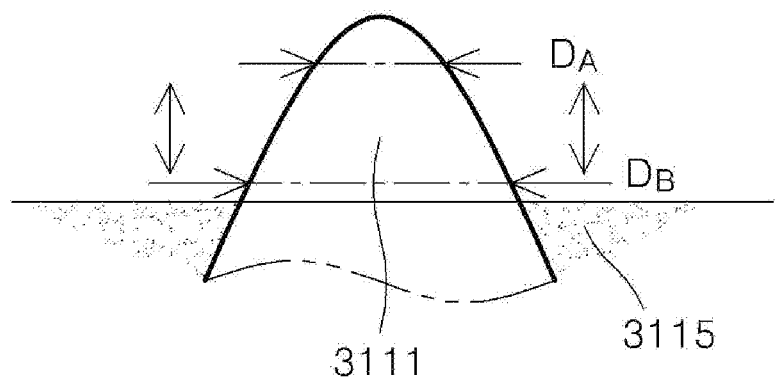
FIGS. 23 and 24 are partial cross-sectional views schematically showing a caulking process of a modification of a collector holder of a collector unit of a torque sensor device according to one embodiment of the present invention.
Figure 24:
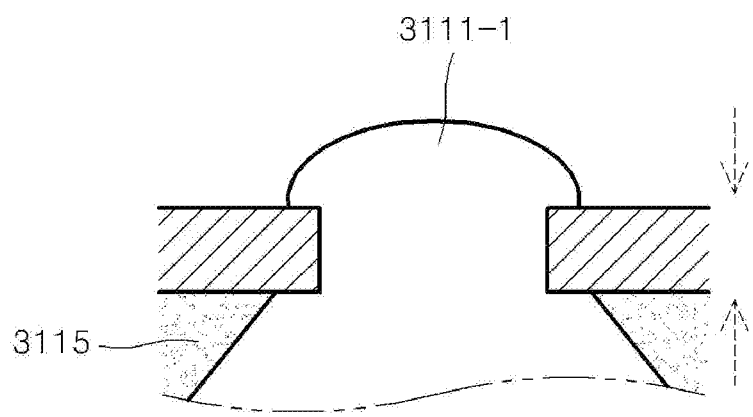
Figure 25:
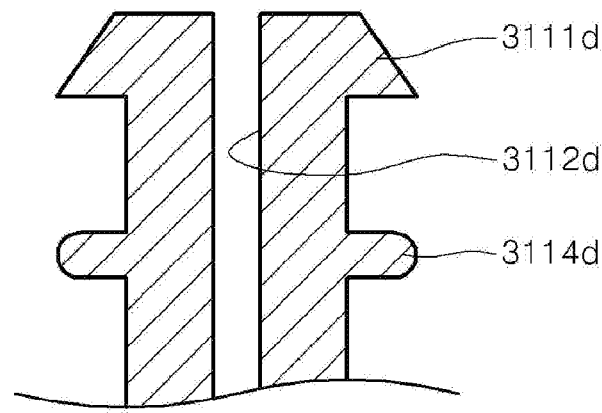
FIG. 25 is a schematic partial cross-sectional view showing another modification of a collector holder of a collector unit of a torque sensor device according to one embodiment of the present invention.

Meanwhile, the collector holder body mounting part 3111 may take an inclined structure for the purpose of the self-alignment of the collector ring in the caulking and assembly process. In other words, as shown in FIGS. 23 and 23, the collector holder body mounting part 3111 forms a structure in which the outer diameter thereof is gradually increased as it goes toward the collector holder body mounting step 3115 ($D_A < D_B$) so that a predetermined position alignment can be achieved through a predetermined self-alignment in an initial insertion process for the purpose of caulking.

In addition, the collector 300 may take various structures besides a caulking structure for mounting the collector holder and the collector ring.

As shown in FIGS. 22 to 25, the collector holder body mounting part ($3111b$, $3111d$) may be formed as a snap fit structure. The collector holder body mounting part ($3111b$, $3111d$) has a hook end, and has a hook bore ($3112b$, $3112d$) at the center thereof to enable a predetermined elastic operation. In addition, in some cases, the collector holder 310 may further include a structure in which the collector holder body mounting part $3111d$ has a fit rib $3114d$ formed on the outer circumference thereof to allow the collector ring to be interposed between the hook end and the fit rib so as to minimize a stress applied to the collector ring.

The sensing unit 400 of the present invention includes a torque sensor 410 that is disposed at the outer circumference of the collector unit 300 and detects the magnetic field focused by the collector unit 300 as described above. The number of the torque sensor 410 that is provided in this embodiment is two to enhance a detection performance, and the torque sensor 410 may further have a fail-safe function. The torque sensor 410 is mounted on a torque sensor substrate 401. The torque sensor 410 is fittingly mounted on a collector ring terminal 3220 formed on the collector ring 3210 of the collector unit 300 so that a change in the magnetic field is extracted in response to an electric signal, and a torque between the input shaft and the output shaft can be calculated based on the extracted change in the magnetic field.

The torque sensor 410 can be modified in various manners depending on the design specifications, such as being implemented as a contactless hall sensor (i.e., hall sensor IC), an MR sensor, an AMR sensor, or a GMR sensor. In other words, the torque sensor 410 takes a structure in which a torque can be calculated based on a difference in the relative rotation between the input shaft 2 and the output shaft 3, and a difference in the electric signal caused by a change in the magnetic field occurring due to the relative rotation between the magnet unit 200 and the shield ring unit 500.

In the meantime, the sensing unit 400 of the present invention may further include an angular sensor module 420 that detects a rotation displacement, i.e., a steering angle of a steering wheel of a vehicle besides the torque sensor 410. The angular sensor module 420 includes an angular sensor 4240, an angular magnet 4230, an angular rotor 4220, and an over body angular gear.

Figure 19:
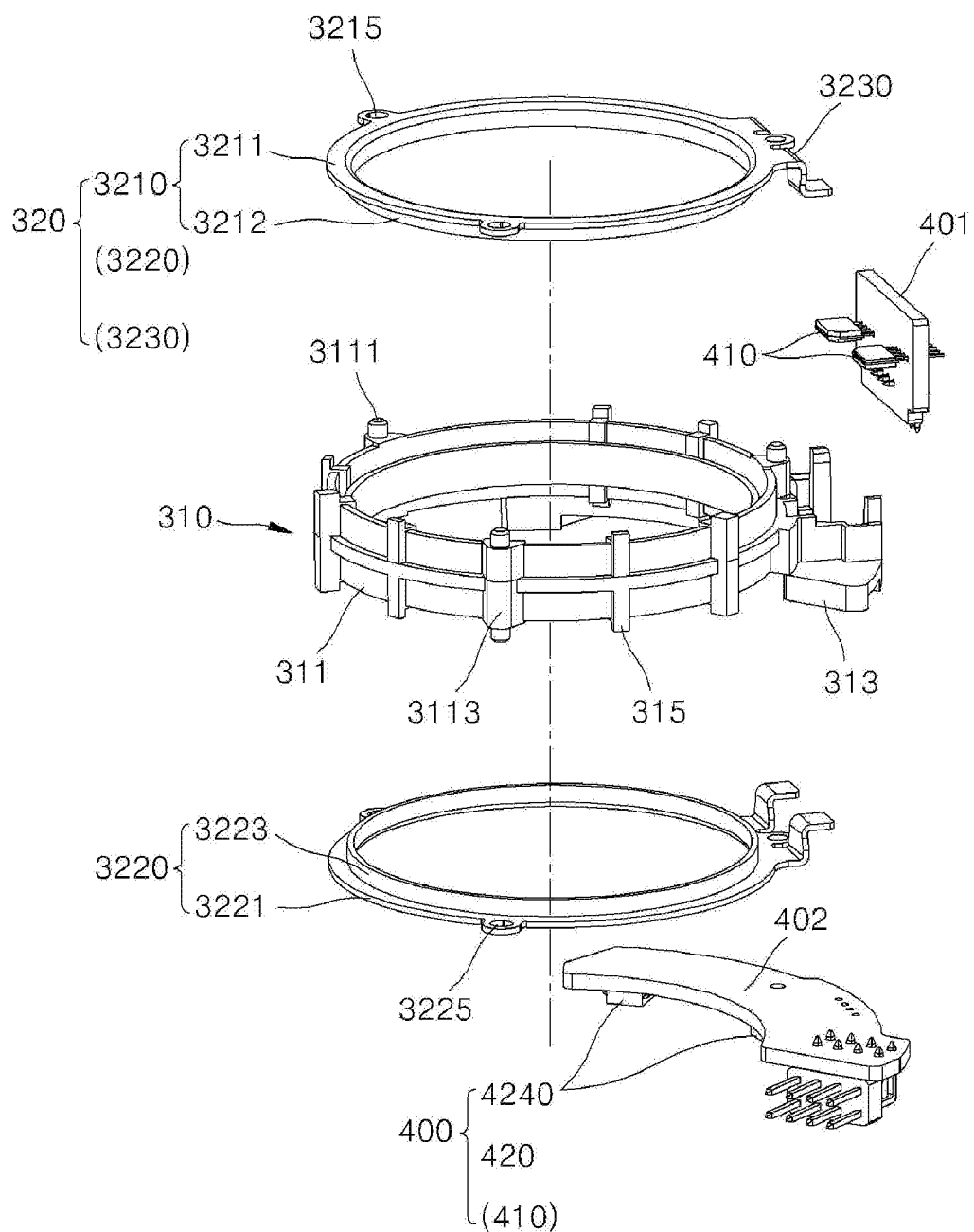
FIG. 19 is a schematic exploded perspective view showing a collector unit of a torque sensor device according to one embodiment of the present invention.
Figure 20:
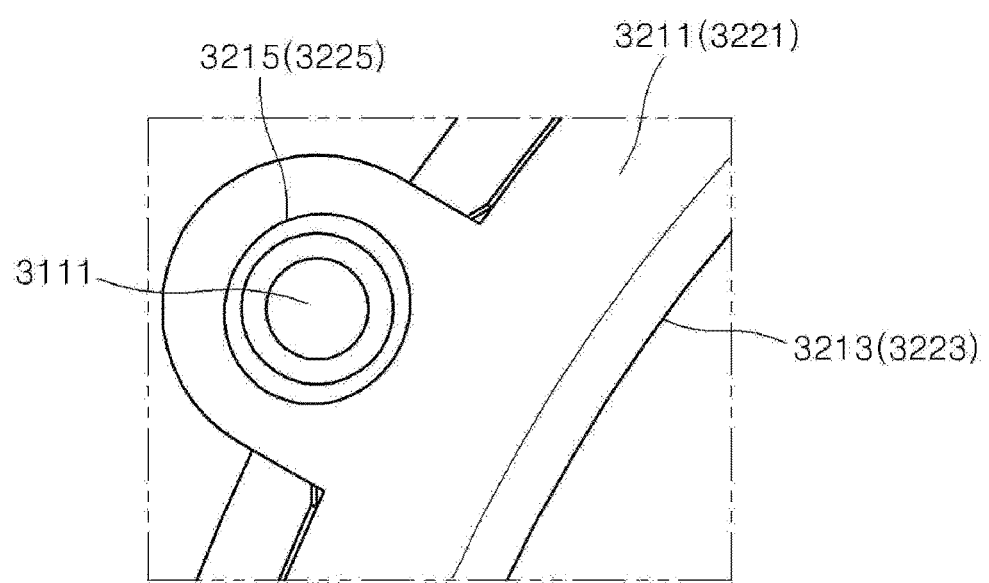
FIG. 20 is a partially enlarged top plan view schematically showing a collector unit of a torque sensor device according to one embodiment of the present invention.

The angular sensor 4240 can be modified in various manners depending on the design specifications, such as being implemented as a contactless hall sensor, an MR sensor, an AMR sensor, or a GMR sensor. The angular sensor 4240 is disposed so as to be fixed in position to the housing 100. The angular sensor 4240 is mounted on an angular sensor substrate 402 (see FIG. 19). The angular sensor substrate 402 is mounted so as to be fixed in position to the housing base 120 of the housing 100. The torque sensor substrate 401 may form a connection structure for establishing the electrical communication with the angular sensor substrate 402. The angular magnet 4230 is disposed at the angular sensor 4240 in a relatively rotatable manner, and the angular magnet 4230 is disposed on the angular rotor 4220.

The number of each of the angular sensor 4240, the angular rotor 4220, and the angular magnet 4230 provided in this embodiment is two so that when an error occurs in one sensor, a signal can be detected by the other sensor through the sensitivity enhancement and the fail-safe function for calibration and crosscheck. But the present invention is not limited thereto. These constituent elements respectively forming a pair basically take the same structure despite different dimensions, and thus a description will be made centering on one of the two structures.

The angular rotor 4220 includes a rotor body 4221, a rotor gear 4225, and a rotor guide 4227. The rotor body 4221 includes a rotor body accommodating part 4223 formed therein so as to allow the angular magnet 4230 to be accommodated in the rotor body accommodating part 4223.

The rotor gear 4225 is disposed on the outer circumferential edge of the rotor and is tooth-engaged with the over body angular gear 533 to perform a relative rotation to achieve the detection of a rotation angle through the rotation of the angular magnet 4230.

The rotor body accommodating part 4223 includes a rotor body accommodating part stopper (42233, 42235). The rotor body accommodating part (4233, 42235) is formed on the inner surface of an accommodating part opening 42231 to prevent an unwanted escape of the angular magnet 4230 from the rotor body 4221. In this embodiment, the angular magnet is formed in the rotor body accommodating part in an insert molding manner, but in some cases, the angular magnet can be modified in various manners, such as taking a direct insertion manner through the rotor body accommodating part stopper structure.

The rotor guide 4227 is formed protrudingly from the rotor body 4221 in the longitudinal direction of a rotary shaft of the rotor body 4221. The rotor guide 4227 achieves a stable rotation of the rotor body through a contact with other constituent element, i.e., the angular holder.

The over body angular gear 533 is provided at a shield ring over-body 530 of the shield ring unit 500. For example, a steering angle at a vehicle wheel connected to a steering shaft of a vehicle can be detected through the detection of the rotation displacement at the output shaft 3

The angular sensor module 420 may further include an angular holder 4210 disposed at the housing 100, more specifically, at the housing base 120 side. The angular holder 4210 is opened at one side thereof to allow the angular rotor 4220 to be rotatably accommodated therein. More specifically, the angular holder 4210 includes an angular holder accommodating part 4213, an angular holder guide 4211, an elastic accommodating part 4217, and an angular holder elastic part 4215.

Figure 27:
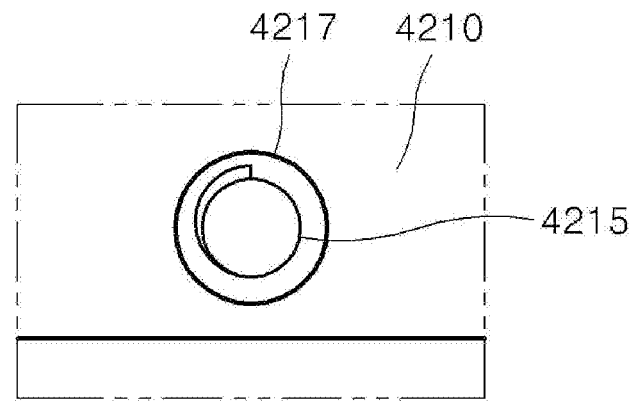
FIG. 27 is a schematic partial rear view showing an angular sensor holder of an angular sensor module of a sensing unit of a torque sensor device according to one embodiment of the present invention.
Figure 28:
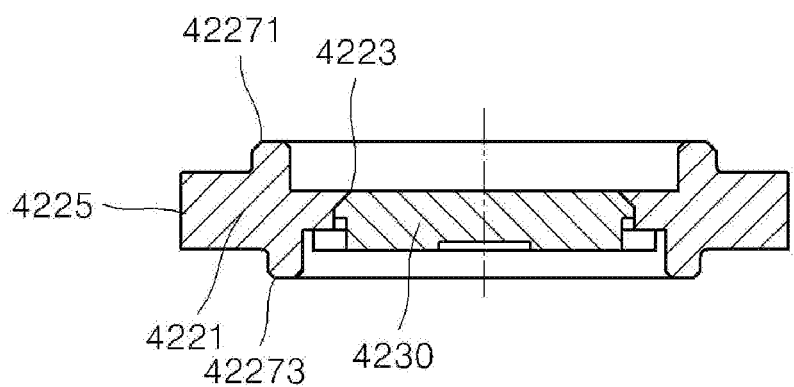
FIG. 28 is a schematic partial cross-sectional view showing an angular rotor of an angular sensor module of a sensing unit of a torque sensor device according to one embodiment of the present invention.
Figure 28:
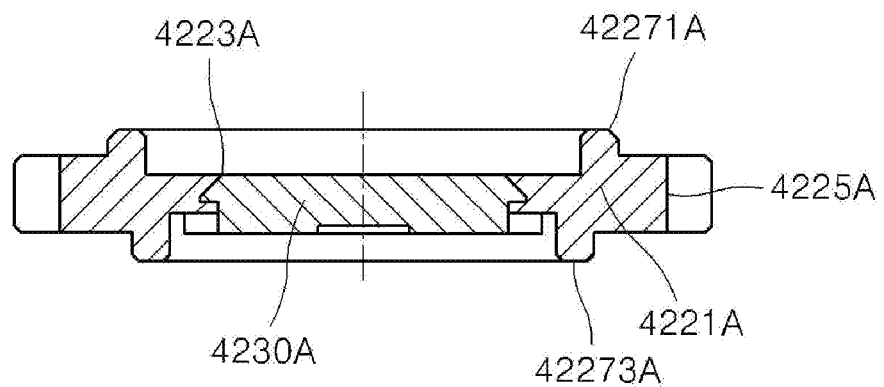
Figure 29:
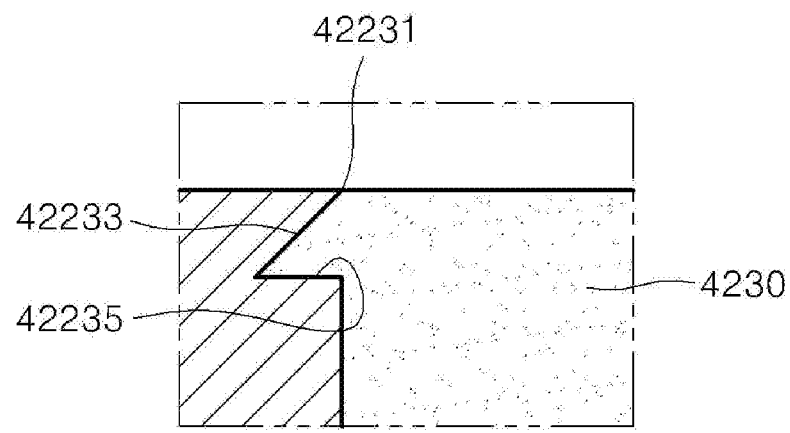
FIG. 29 is a partially enlarged cross-sectional view showing an angular rotor of a torque sensor device according to one embodiment of the present invention.

The angular holder accommodating part 4213 is formed as a space that can accommodate the rotor gear 4225 without any interference upon the rotation of the rotor body 4221, and the angular holder guide 4211 supports the rotor guide 4227, i.e., the rotor body 4221 in a relatively rotatable and surface contactable manner to correspond to the rotor guide (4227; 42271, 42273). The elastic accommodating part 4217 is disposed at an opposite side to the opened one side of the angular holder 4210, i.e., an opposite side to a side where the angular rotor 4220 is accommodated, and the angular holder elastic part 4215 is accommodatingly supported at one end thereof by the elastic accommodating part 4217 (see FIG. 27) and is supported at the other end thereof by the housing 100 to provide an elastic support force to the angular holder 4210.

In some cases, the angular holder 4210 includes a movable guide 4218 formed thereon in the longitudinal direction thereof where the angular holder 4210 is movable, and the housing includes a movable guide counterpart (not shown) formed thereon to correspond to the movable guide 4218 to achieve a stable movement at an elastic support state of the angular holder 4210.

Figure 26:
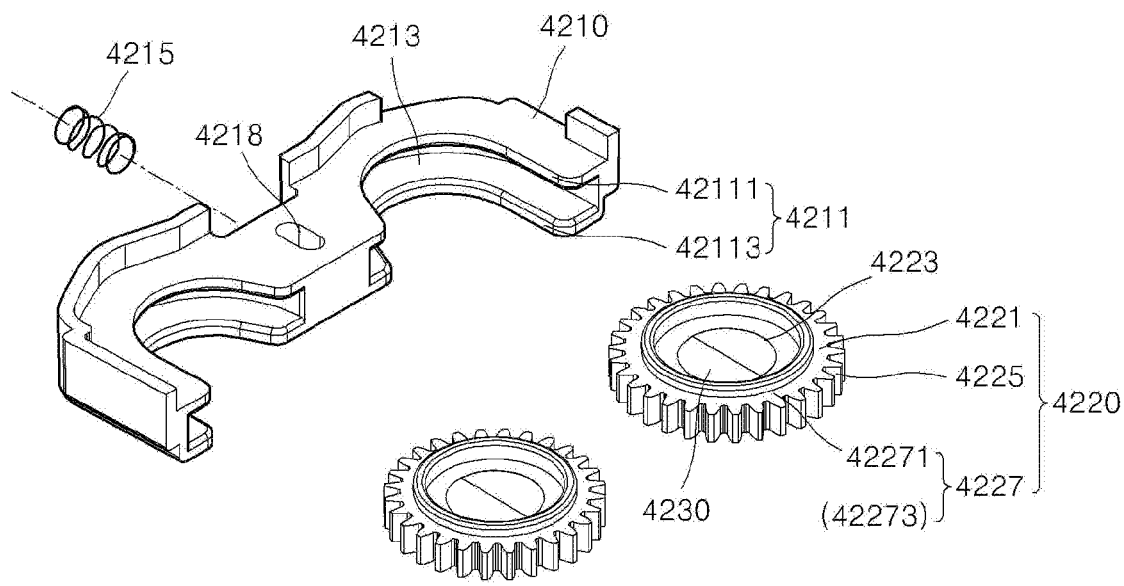
FIG. 26 is a schematic exploded perspective view showing an angular sensor module of a sensing unit of a torque sensor device according to one embodiment of the present invention.

In this case, the angular holder guide 4211 and the rotor guide (42271, 42273) are disposed to correspond to each other in such a manner as to form a pair in the longitudinal direction of a rotary shaft of the rotor body 4221. In other words, as shown in FIG. 26, the number of each of the angular holder guide and the rotor guide disposed is two.

By virtue of this abutting structure, a function of a journal bearing may be performed to allow the angular rotor to form a stable rotation guide structure with respect to the angular holder.

In the meantime, the angular holder guide and the rotor guide that form a pair spaced apart from each other in the longitudinal direction of the rotary shaft may take structures that are different from each other. That is, the rotor guide includes a rotor upper guide 42271 and a rotor lower guide 42273. The angular holder guide 4211 includes an angular holder upper guide 42111 and an angular holder lower guide 42113. The angular holder upper guide 42111 and the angular holder lower guide 42113 have different dimensions between a pair, i.e., an upper part and a lower part, which are formed by the angular holder upper guide 42111 and the angular holder lower guide 42113, so that an erroneous assembly state can be completely prevented in which the angular rotor is insertingly accommodated in a state of being turned over and reversed.

A description has been made centering on only a structure having different dimensions for the upper and lower sides, i.e., the upper and lower parts of the rotary shaft in this embodiment. But in the case where the angular rotor is provided in plural numbers, at least one of the upper part and the lower part between the plural angular rotors may have a dimension that is not overlapped to prevent all the angular rotors from being insertingly disposed at a position other than a preset position.

Figure 30:
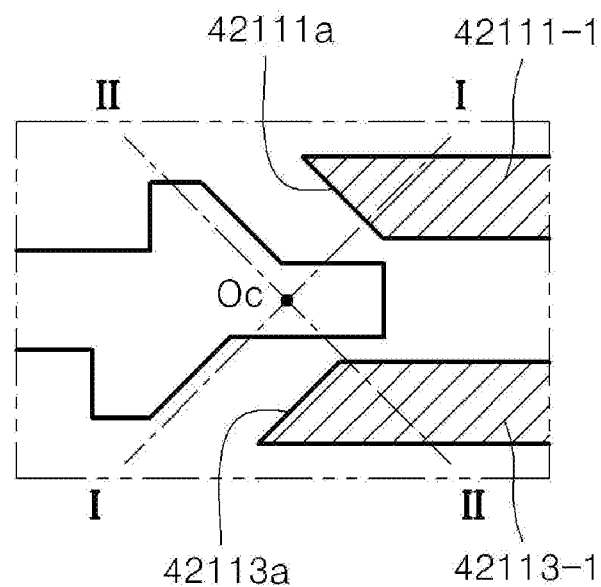
FIG. 30 is a partially enlarged cross-sectional view showing an angular rotor and an angular holder of a torque sensor device according to one embodiment of the present invention.
Figure 31:
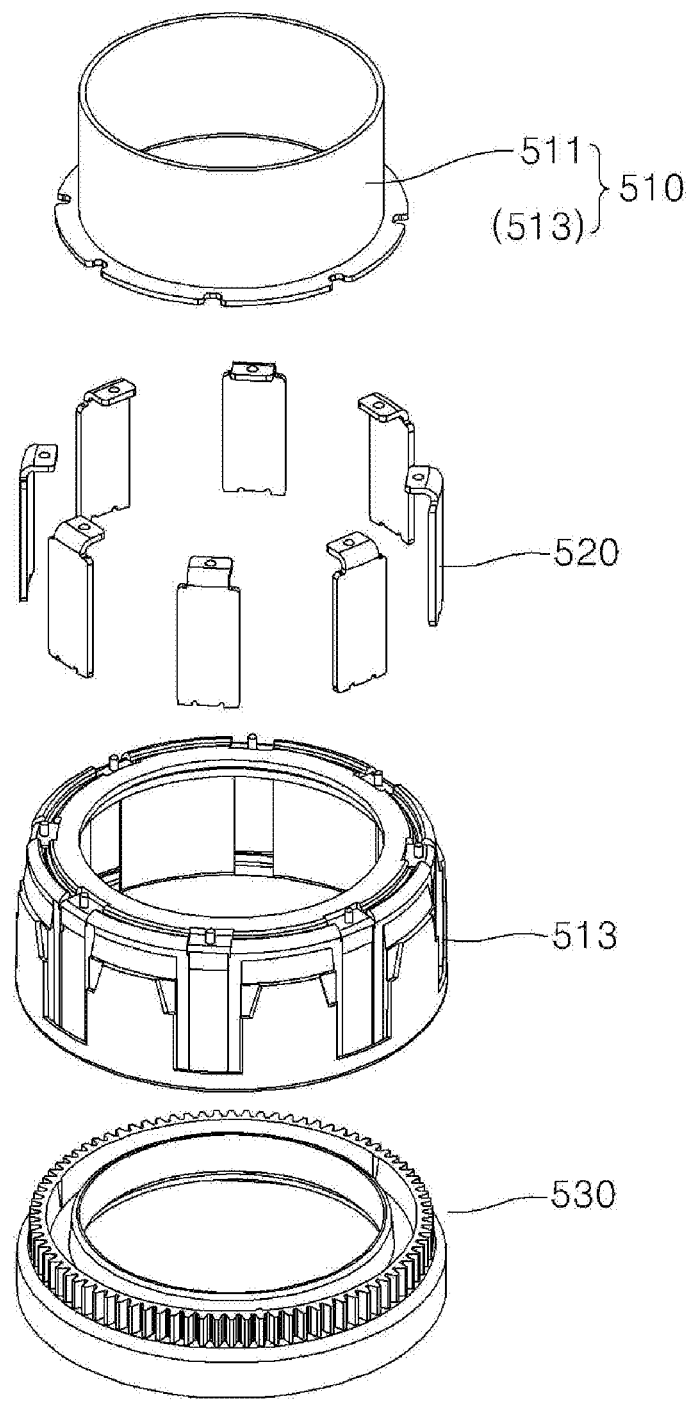
FIG. 31 is a schematic exploded perspective view showing a shield ring unit of a torque sensor device according to one embodiment of the present invention.

In addition, the rotor upper guide 42271 and the rotor lower guide 42273, and the angular holder upper guide 42111 and the angular holder lower guide 42113 may take a structure of reinforcing a stable rotation of the angular rotor. That is, the angular holder upper guide 42111 and the angular holder lower guide 42113 may take a structure in which they include inclined faces in such a manner that the inclined faces formed by the upper part and the lower part are oriented toward the center side of the angular rotor, in other words, normal lines (i.e., lines I-I and II-II) of the inclined faces intersect each other (Oc) toward the center of the rotary shaft of the angular rotor, and the rotor upper guide 42271 and the rotor lower guide 42273 may also take a structure in which they include a corresponding inclined face (see FIG. 30). As such, the rotor upper guide 42271 and the rotor lower guide 42273 may take a structure in which the normal line of the inclined face is oriented toward the center of the rotary shaft and the center of a ">" shape to stably accommodate the angular rotor with respect to the upper and lower sides. In other words, the positional shift of the angular rotor to the longitudinal direction of the rotary shaft during the rotation of the angular rotor can be prevented to significantly reduce a possibility of occurrence of an erroneous detection state through formation of a more stable operation state. Of course, even in the case where the lengths of the rotor upper guide and the rotor lower guide that protrude toward the rotary shaft of the angular rotor may have different values to prevent an erroneous assembly of the angular rotor forming the upper and lower parts or a pair. By virtue of this structure, the angular rotor can form a stable rotation structure at the accommodating part of the angular holder.

As described above, the shield ring unit 500 of the present invention is disposed between the collector unit 300 and the magnet unit 200, and is connected to one end of the output shaft 3 to change the magnetic field from the magnet unit 200, which is focused by the collector unit 300, by means of the relative rotation between the input shaft 2 and the output shaft 3 to allow the torque sensor 410 of the sensing unit 400 to output a changed electric signal due to a change in the magnetic flux so that a torque applied to the input shaft and the output shaft can be detected.

The shield ring unit 500 of the present invention includes a shield ring body 510 and a plurality of shield ring pieces 520. The shield ring body 510 is disposed inside the collector unit 300 and accommodates the magnet unit 200 therein in a relatively rotatable manner. The shield ring body 510 is interposed between the magnet unit 200 disposed at the input shaft side and the collector unit 300 to rotate together with the output shaft 3. The plurality of the shield ring pieces 520 is arranged on the outer circumference of the shield ring body 510 in such a manner as to be spaced apart from one another at predetermined intervals.

The shield ring pieces 520 are formed of a soft magnetic material such as permalloy to perform a function of change a path of the magnetic field between the magnet unit and the collector unit, but is not limited thereto. The shield ring pieces 520 can be manufactured through a process of punching or cutting a strip type material, and can be formed as a reel type material so as to be insertingly disposed at the shield body through a certain automated process.

Each of the shield ring pieces 520 includes a ring piece body 521 and a ring piece connection part 523. The ring piece body 521 is disposed at the shield ring body 510, more specifically, a shield body holder ring piece seating part 5135, so as to be substantially perpendicular to a radial direction of the shield ring unit 500. The ring piece connection part 523 is disposed to extend vertically inwardly from an end of the ring piece body 521 and is seated in a shield body rounder seating part 51311. Each of the shield ring pieces 520 may take a structure in which it is formed as a unit body so as to be manufactured through a bending process. The ring piece connection part 523 includes a ring piece connection mounting part 525 formed penetratingly thereon.

The ring piece body 521 may include a chamfered edge 528 formed at an end thereof to form a stable and smooth insertion structure in the insertion process of the ring piece body 521 into the shield ring body 521.

Such a method of insertingly mounting the shield ring pieces 520 can achieve the material cost reduction and the process cost reduction through the automated process. In addition, the simplification and optimization of the shape of the shield ring piece 520 can minimize the amount of scrap or the like to prevent unnecessary waste of materials, thereby achieving a reduction in the manufacturing cost. Besides, the automatic assembly is possible to reduce a process error and enhance a yield of good products.

Further, the insertion structure of inserting the plurality of shield ring pieces 520 into the shield ring body 510 can completely prevent possibilities of distinct separation between a shield part region and a non-shield part region as well as exposure of an unwanted region, thereby avoiding a problem of degradation and failure of sensitivity. In other words, in the case where a strip type shield ring having a through-opening as a non-shield part, which is a constituent element having the same function, is formed instead of the shield ring piece as a conventional shield ring, and the strip type shield ring is insert-molded into the shield ring body, it is not easy to constantly and uniformly form a molding thickness for a molded portion of the strip type shield ring due to a thickness dimension limitation of the shield ring body, thus causing a defect problem in that the shield ring is exposed even for a molded portion that needs not to be exposed. This defect problem can be fundamentally prevented through the piece type insertion structure of the present invention.

The shield ring body 510 includes a shield sleeve 511 and a shield body 513. The shield sleeve 511 may be formed of a material such as austenitic stainless steel to secure rigidity of maintaining a stable connection state with the output shaft 3, but various materials for the shield sleeve 511 be selected within a range of securing a predetermined rigidity.

The shield sleeve 511 is connected to one end of the input shaft 2. The shield sleeve 511 includes a sleeve shaft 5111 and a sleeve peripheral part 5113. The sleeve shaft 5111 is connected to one end of the input shaft 2, and has a through-opening 5112 formed at the center thereof so as to allow an constituent element such as a torsion bar to pass therethrough.

The sleeve peripheral part 5113 is formed to extend outwardly radially from a lower end of the sleeve shaft 5111.

The sleeve peripheral part 5113 includes a plurality of grooves 5115 formed along the outer circumferential edge thereof so that a relative rotation with a shield body 513 can be prevented. The shield ring body may be formed through a separate fastening structure of the shield sleeve and the shield body, but takes a structure in which the shield sleeve is formed integrally with the shield body through insert-molding.

The shield body 513 is connected to the shield sleeve so that the shield ring pieces are mounted on the shield sleeve. The shield body 513 includes a shield body rounder 5131 and a shield body holder 5133. The shield body rounder 5131 is connected to the shield sleeve, and the shield body holder 5133 is connected to the shield body rounder 5131 to allow the shield ring pieces 520 to be accommodatingly mounted thereon.

The shield body rounder 5131 includes a plurality of shield body rounder seating parts 51311 to allow one ends of the shield ring pieces 520 to be seated thereon. The shield body rounder seating part 51311 includes a seating groove 51311*a* and a seating fusion protrusion 5131*b*. The seating groove 51311*a* is formed on one side of the shield body rounder seating part 51311. The seating groove 51311*a* is formed as a recessed structure so that the ring piece connection part 523 connected to the ring piece body 521 of the shield ring piece 520 can be accommodated in the seating groove.

The seating fusion protrusion 51311*b* is formed on one side of the seating groove 51311*a* and is formed as a protrusion structure that can be inserted into the ring piece connection mounting part 525. In this embodiment, the seating fusion protrusion 51311*b* is penetratingly inserted into the ring piece connection mounting part 525 and then is pressed by heat-fusion so that the escape of the shield ring can be prevented.

The shield body holder 5133 includes a plurality of ring piece through-openings 5134 formed thereon. Each of the inner walls of the ring piece through-openings 5134 includes a ring piece seating part 5135 formed thereon. The ring piece seating parts 5135 seatingly support the other ends of the shield ring pieces 520, i.e., the ring piece bodies 521 to form a stable mounting structure within the shield body holder.

The shield body holder ring piece seating part 5135 includes a ring piece seating align guide 5135*a*. The ring piece seating align guide 5135*a* is inclinedly formed as a dovetail structure on the inner side of the ring piece through-opening 5134 so as to be oriented toward the center axis of the shield body holder 5133. In other words, the inner width formed by the ring piece seating align guide 5135*a* has a value larger than the width of the ring piece through-opening 5134 to prevent an end of the ring piece body from escaping to the outside.

In addition, the shield body holder ring piece seating part 5135 includes a ring piece seating stopper 5135*b*. The ring piece seating stopper 5135*b* takes a structure in which it is formed at an end of the shield body holder ring piece seating part 5135, which is substantially perpendicular to the rotary shaft of the shield body holder 5133 to support an end of the ring piece body of the shield ring piece.

In this case, the ring piece seating stopper 5135*b* includes a ring piece guide counterpart 5137 formed on one side thereof, and the ring piece body 521 includes a ring piece guide 527 formed on an end thereof to form a structure in which the ring piece guide counterpart 5137 and the ring piece guide 527 are engaged with each other. In this embodiment, the ring piece guide 527 takes a recessed structure and the ring piece guide counterpart 5137 takes a protrusion structure, and vice versa. In this embodiment, each of the ring piece guide 527 and the ring piece guide counterpart 5137 is provided in plural numbers, but the ring piece guide 527 and the ring piece guide counterpart 5137 of the present invention are not limited thereto.

In the meantime, the shield ring unit 500 further includes a shield ring over-body 530. The shield ring over-body 530 is coupled to the shield ring body 510 and fixedly supports the shield ring pieces 520 mounted on the shield ring body 510.

The shield ring over-body 530 includes an over-body through-opening 531 formed therein to allow other constituent elements to be passed therethrough, and an over body angular gear 533 formed on the outer circumference thereof so as to be tooth-engaged with the angular rotor 4220 on which the angular magnet 4230 of the sensing unit 400 is mounted.

The shield ring over-body 530 may be coupled through a separate fastening method, but in this embodiment, it can provide an integral structure of preventing a change in positions of constituent elements by adopting a method of over-molding the shield ring body on which the shield ring pieces are mounted using an insert-molding technique.

Figure 32:
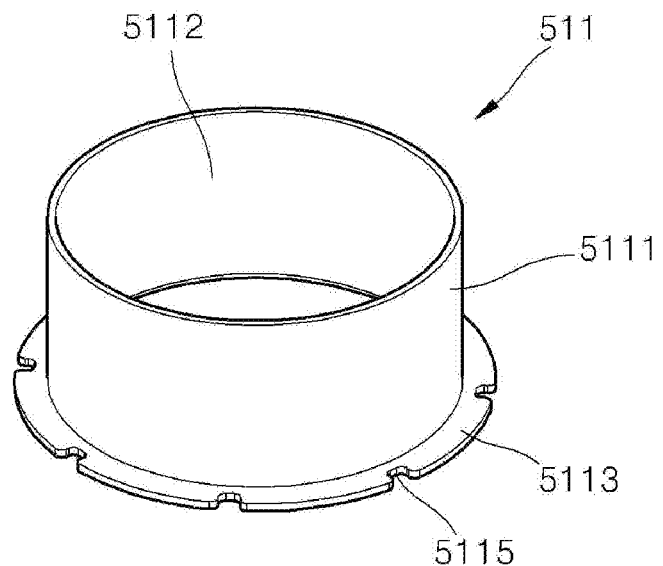
FIG. 32 is a schematic perspective view showing a shield sleeve of a torque sensor device according to one embodiment of the present invention.
Figure 33:
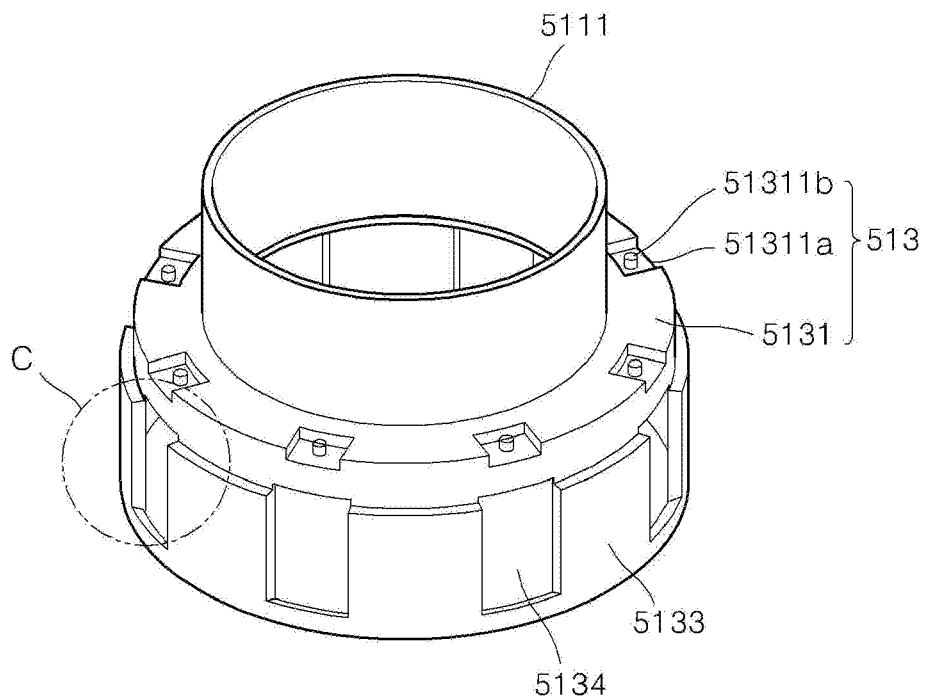
FIG. 33 is a schematic perspective view showing a shield ring body of a torque sensor device according to one embodiment of the present invention.
Figure 34:
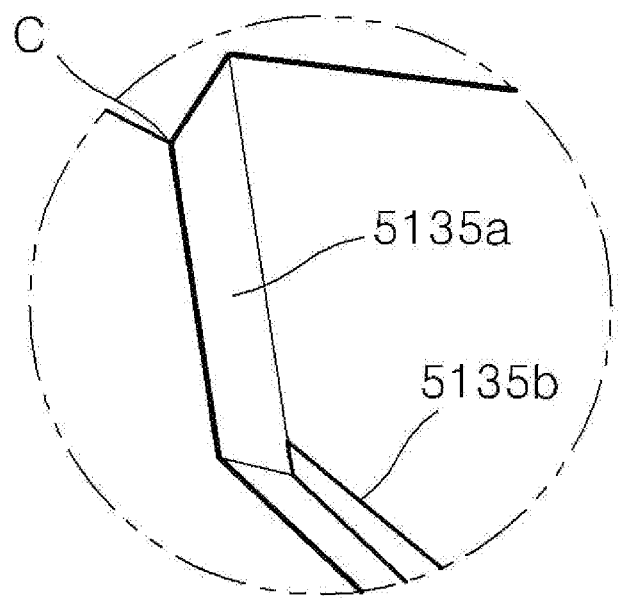
FIG. 34 is a partially enlarged perspective view schematically showing a shield ring body of a torque sensor device according to one embodiment of the present invention.
Figure 35:
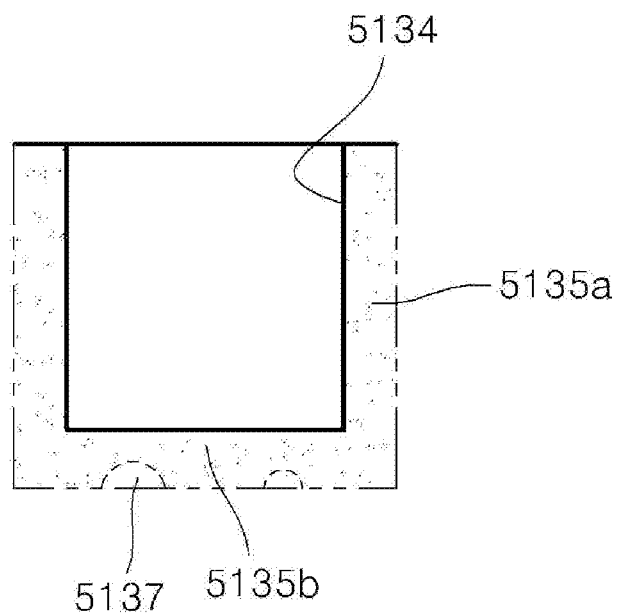
FIG. 35 is a partially enlarged perspective view schematically showing a modification of a shield ring body of a torque sensor device according to one embodiment of the present invention.
Figure 36:
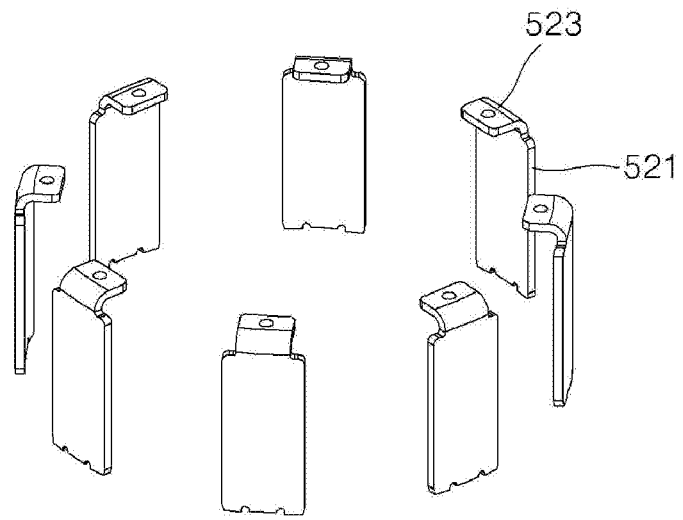
FIG. 36 is a schematic perspective view showing shield ring pieces of a torque sensor device according to one embodiment of the present invention.

The shield body 513 is formed through a primary molding process of the shield sleeve 511 to form the shield ring body 510, and the shield ring pieces 520 is prepared through punching or cutting and bending (see FIGS. 32, 33 and 36).

Figure 37:
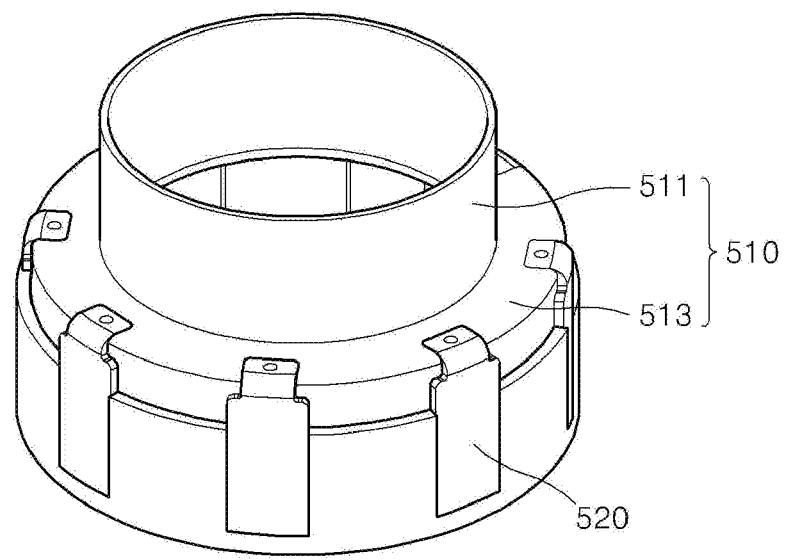
FIG. 37 is a schematic perspective view showing an assembled state of a shield ring body and shield ring pieces of a torque sensor device according to one embodiment of the present invention.
Figure 38:
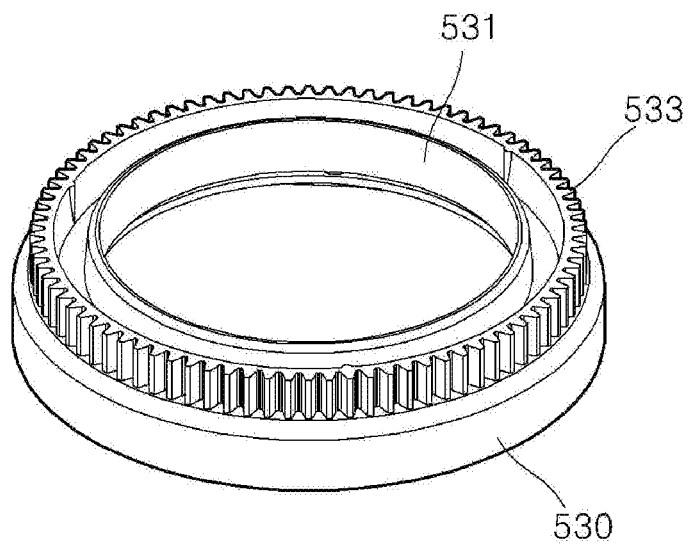
FIG. 38 is a schematic perspective view showing a shield ring over-body of a torque sensor device according to one embodiment of the present invention.
Figure 39:
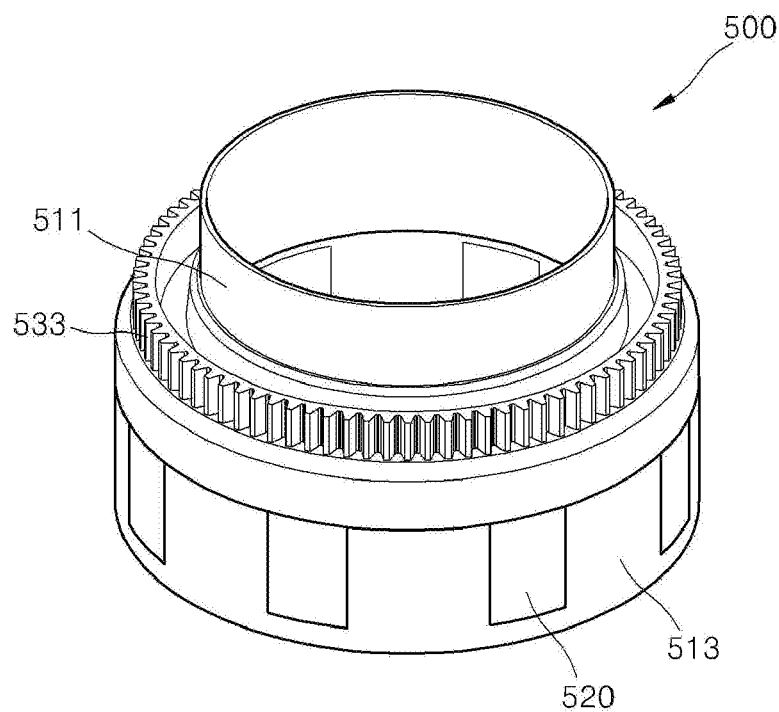
FIG. 39 is a schematic assembled perspective view showing a shield ring unit of a torque sensor device according to one embodiment of the present invention.
Figure 40:
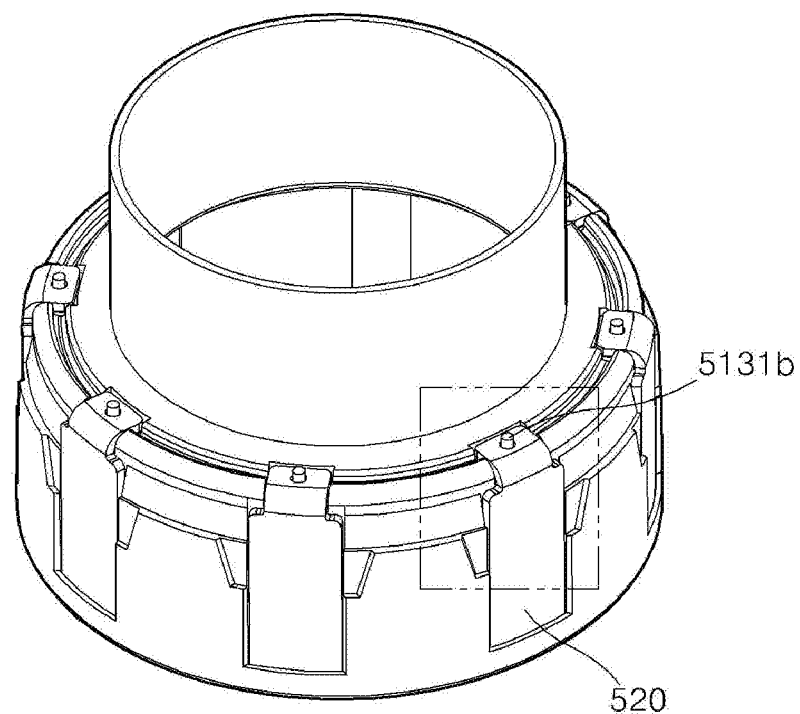
FIG. 40 is a schematic perspective view showing a state after shield ring pieces are assembled with a shield ring body and a state before they are heat-fused to the shield ring body in a torque sensor device according to one embodiment of the present invention.
Figure 41:
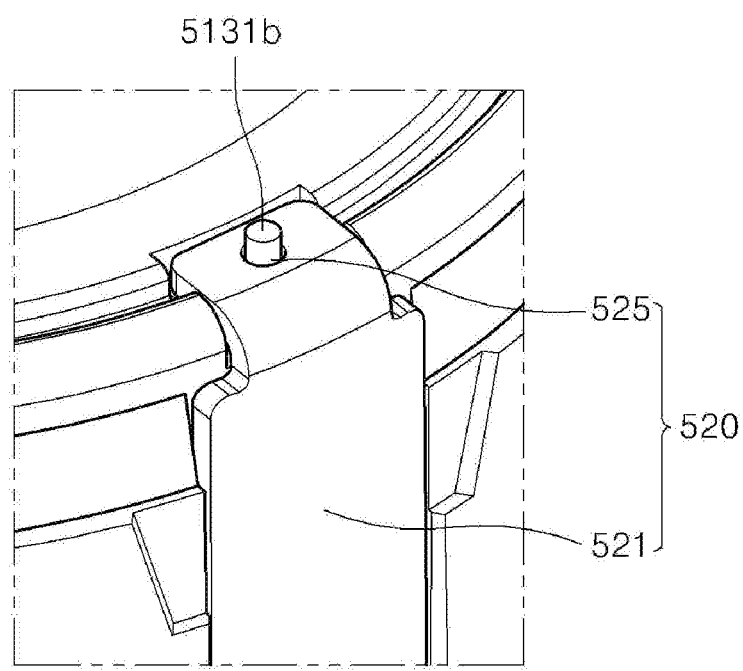
FIG. 41 is a partially enlarged perspective view of FIG. 40.
Figure 42:
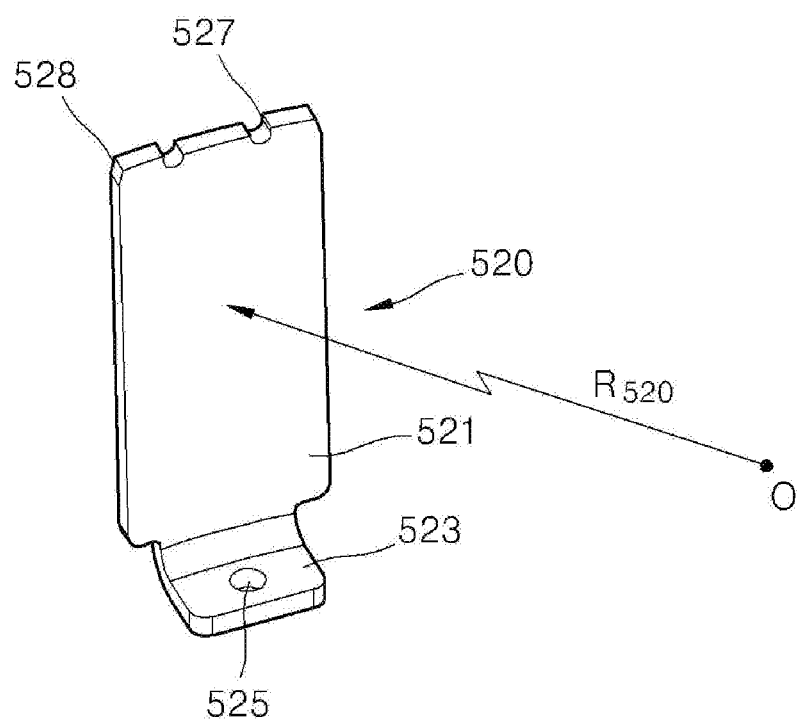
FIG. 42 is a schematic perspective view showing a shield ring piece of a torque sensor device according to one embodiment of the present invention.
Figure 43:
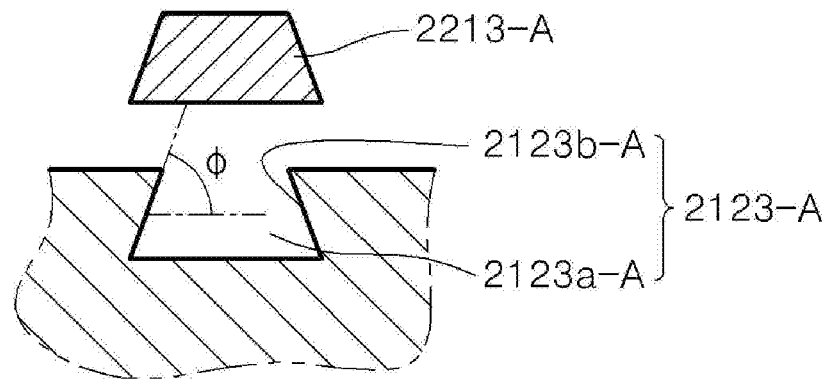
FIGS. 43 and 44 are partial cross-sectional views showing modifications of a holder base body fit and a magnet ring body fit of a torque sensor device according to one embodiment of the present invention.
Figure 44:
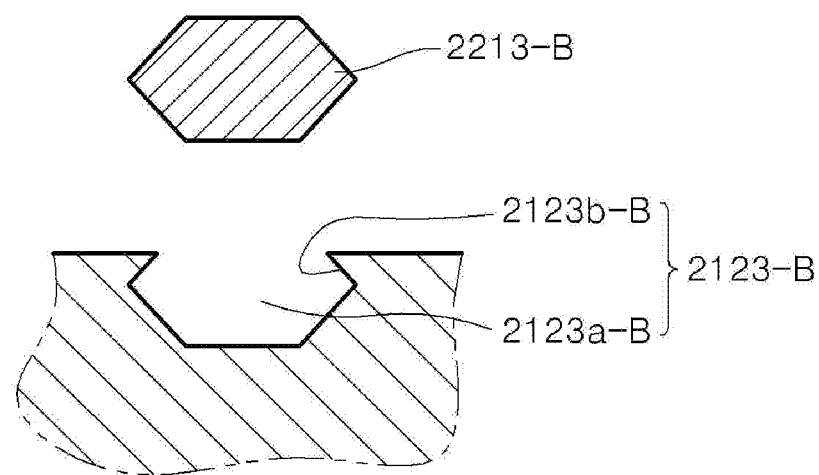
Figure 45:
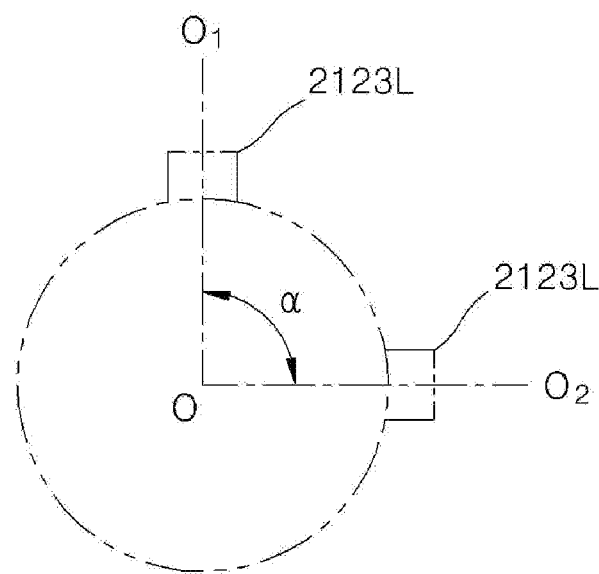
FIG. 45 is a schematic top projection view showing the positional relationship between holder base body fits of a torque sensor device according to one embodiment of the present invention.
Figure 46:
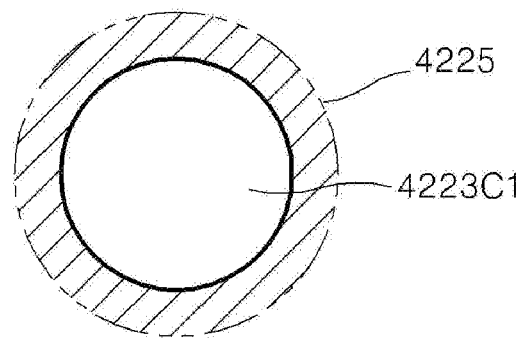
FIG. 46 shows schematic partial top plan views of modifications of an arrangement state of an angular magnet disposed within an angular rotor of a torque sensor device according to one embodiment of the present invention.
Figure 46:
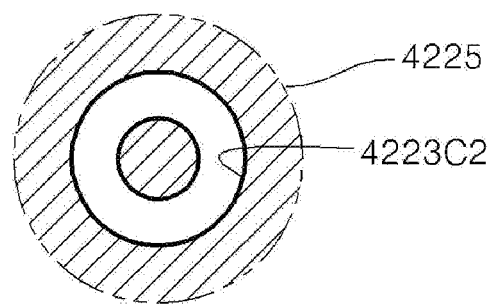
Figure 46:
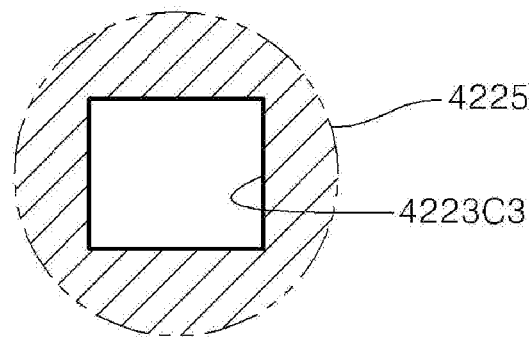
Figure 47:
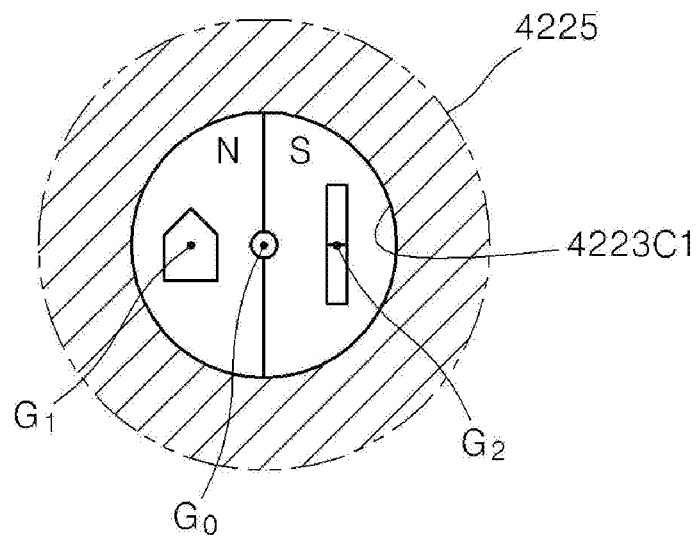
FIGS. 47 to 49 are partial top plan, perspective, and top plan views schematically showing an arrangement state of a rotor body guide and an angular magnet guide of a torque sensor device according to one embodiment of the present invention.
Figure 48:
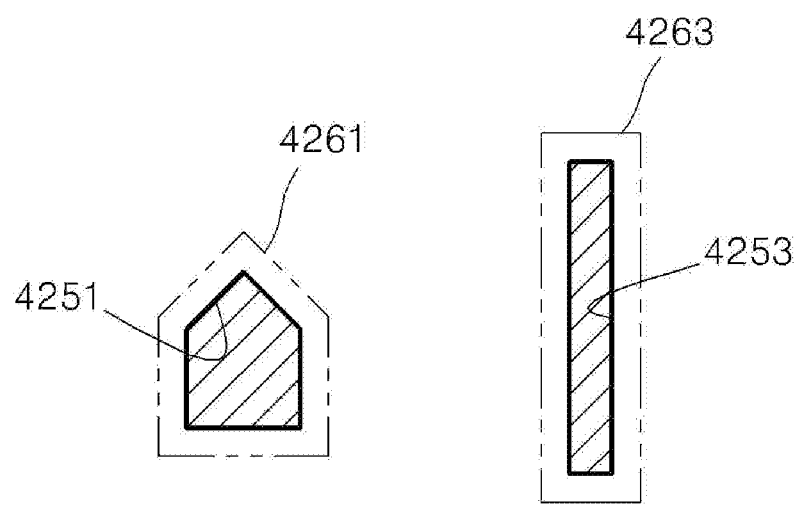
Figure 49:
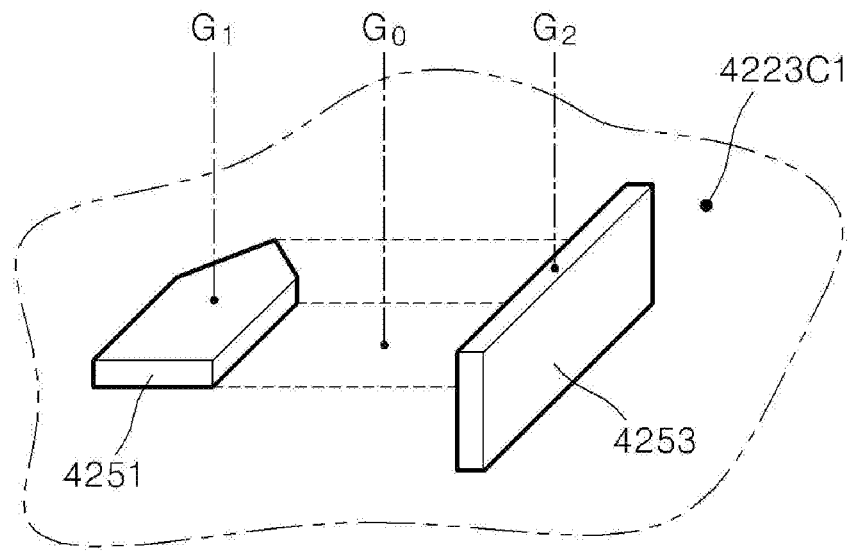
Figure 50:
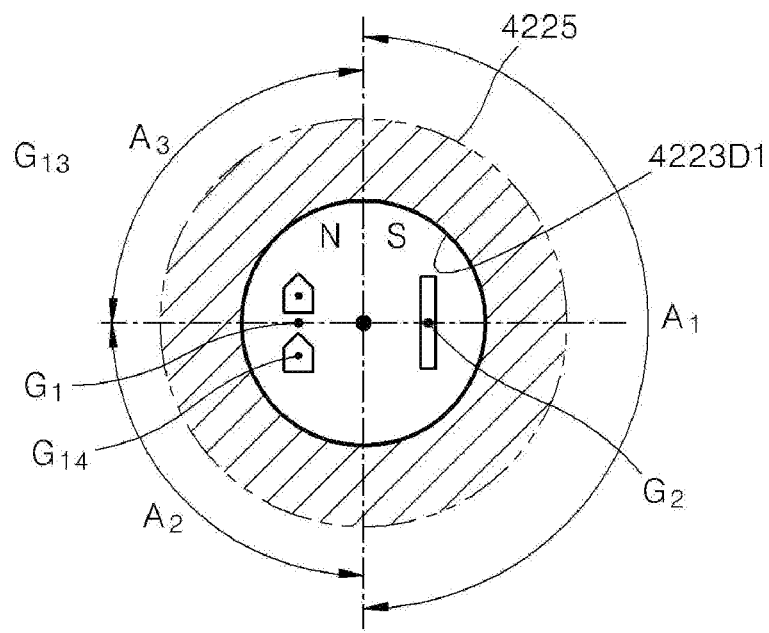
FIG. 50 is a partial top plan view schematically showing an arrangement state of another modification of a rotor body guide and an angular magnet guide of a torque sensor device according to one embodiment of the present invention.
Figure 51:
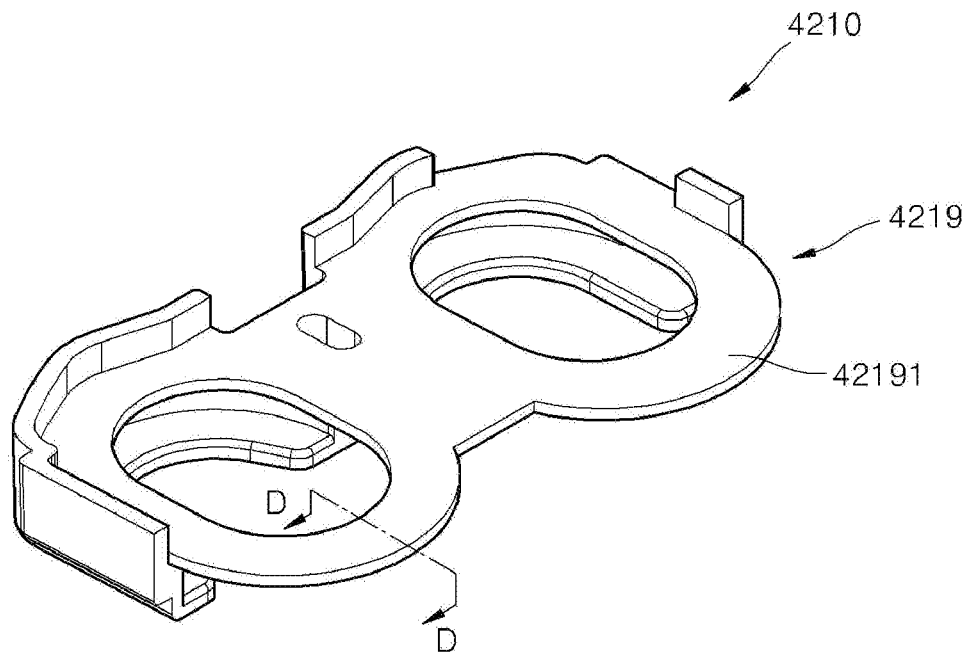
FIG. 51 is a schematic perspective view showing a modification of an angular holder including an angular holder shield part of a torque sensor device according to one embodiment of the present invention.

Thereafter, the shield ring pieces 520 are insertingly mounted to the shield ring body 510 (see FIG. 37). After the shield ring pieces 520 are insertingly mounted to the shield ring body 510, i.e., the seating fusion protrusions 51311*b* are disposed to penetrate through the ring piece connection mounting parts 525 of the shield ring pieces 520 so that after the ring piece connection part 523 is accommodatingly seated on the seating groove 51311*a* of the shield body rounder seating part 51311, and the other end of the ring piece body 521 of the shield ring piece 520 is guided by the ring piece seating align guide 5135*a* of the shield ring piece 520 and supported by the ring piece seating stopper 5135*b* to complete an insertion operation of preventing unwanted escape of the shield ring piece. Thereafter, the seating fusion protrusion may be heat-fused to securely fix the position of the shield ring piece. Then, one end of the shield ring body, i.e., the ring piece connection part of the shield ring piece is over-molded so that the shield ring over-body 530 can be formed at a side of the shield ring body (see FIGS. 38 and 39).

Meanwhile, in this embodiment, the shield ring piece takes a configuration in which it has a predetermined bent shape to constantly maintain a gap between the magnet ring and the shield ring piece in a circumferential direction, for example, to allow the ring piece body 521 of the shield ring pieces 520 (see FIG. 52) to have a predetermined radius of curvature along the circumference of the shield ring body so as to secure sensitivity and reliability through the ensurance of uniformity, but the present invention is not limited thereto.

Figure 57:
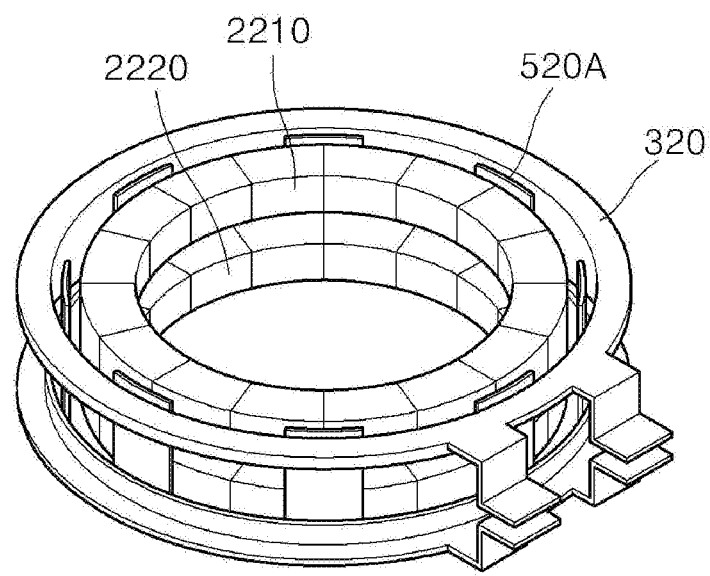
FIGS. 57 and 58 are perspective and top plan views showing a mounting state of a modification of shield ring pieces of a torque sensor device according to one embodiment of the present invention.
Figure 58:
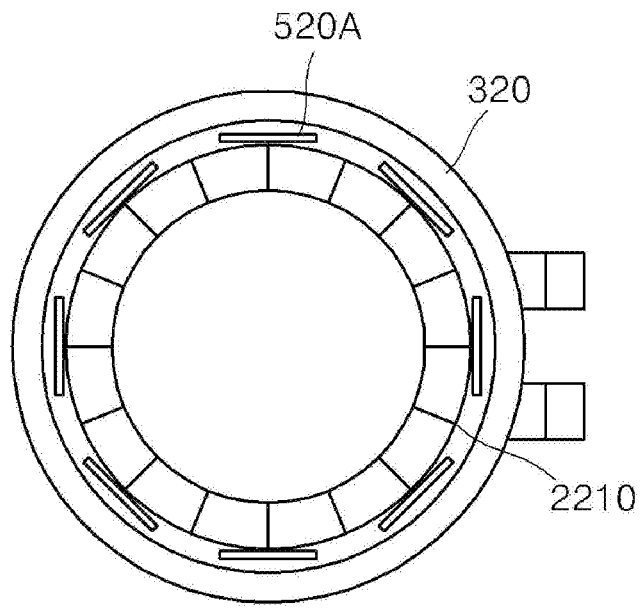

FIGS. 57 to 60 show a shield ring piece 520A according to another modification of one embodiment of the present invention. The shield ring piece 520A is implemented as flat pieces of a flat structure. As shown in FIG. 57, the shield ring piece 520A is interposed between the collector 320 of the collector unit 300 and the magnet ring 2210. In this embodiment, it has been illustrated that the magnet ring 2210 is magnetized to have a total of 16 N and S poles, and a total of 8 shield ring pieces are arranged, but this is merely one example and is not limited thereto. A portion formed by the shield ring bodies of the shield ring pieces from the center of the shield ring bodies of the shield ring pieces takes a structure in which it has an infinite radius of curvature (R520=∞).

Figure 59:
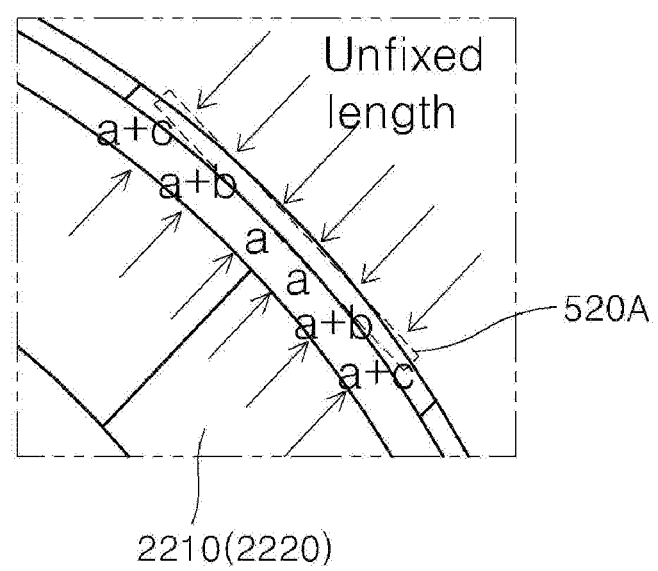
FIGS. 59 and 60 are partially enlarged top plan and diagrammatic views showing an air gap between a magnet ring and a shield ring piece of a torque sensor device according to one embodiment of the present invention.
Figure 60:
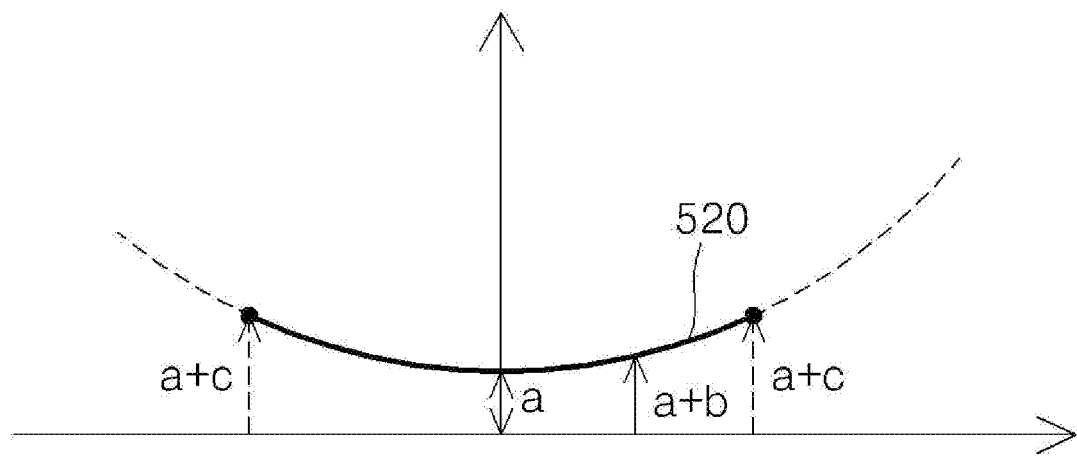
Figure 63:
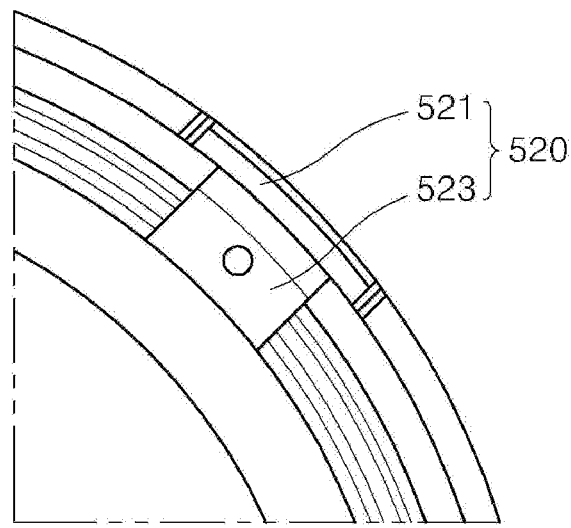
FIG. 63 is a partial top plan view showing a mounting state of a structure having a predetermined curvature and a flat piece structure of a shield ring piece of a torque sensor device according to one embodiment of the present invention.
Figure 63:
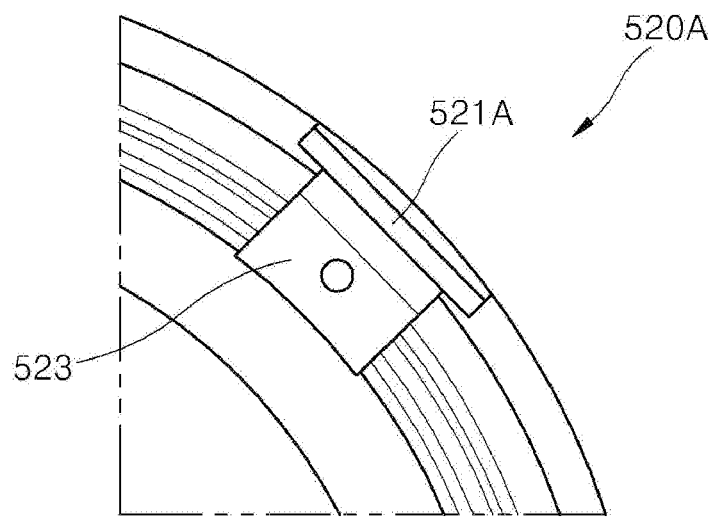

FIGS. 59 and 60 show a partially enlarged top plan view of a shield ring piece 520A of a flat piece structure and a diagrammatic view of an air gap profile as a gap between the shield ring piece 520A and the magnet ring 2210. In other words, the gap between the shield ring piece 520A and the magnet ring 2210 has a structure in which it is gradually increased as it goes away from the center of the ring piece body of the shield ring piece 520A (a+c>a+b>a). A difference between the air gaps between the shield ring pieces and the magnet ring is reduced as the number of the shield ring pieces is increased, i.e., the number of the magnetized magnet rings is increased to cause the number of the corresponding shield ring pieces to be increased so that the circumferential width of the magnet ring is reduced. FIGS. 63(a) and 63(b) show the states in which the shield ring piece 520A of a flat piece structure and the shield ring pieces 520 of a round (curvature) structure are mounted.

Meanwhile, the shield ring piece implemented as a flat shield may form a sensitivity improvement structure through width adjustment.

Figure 61:
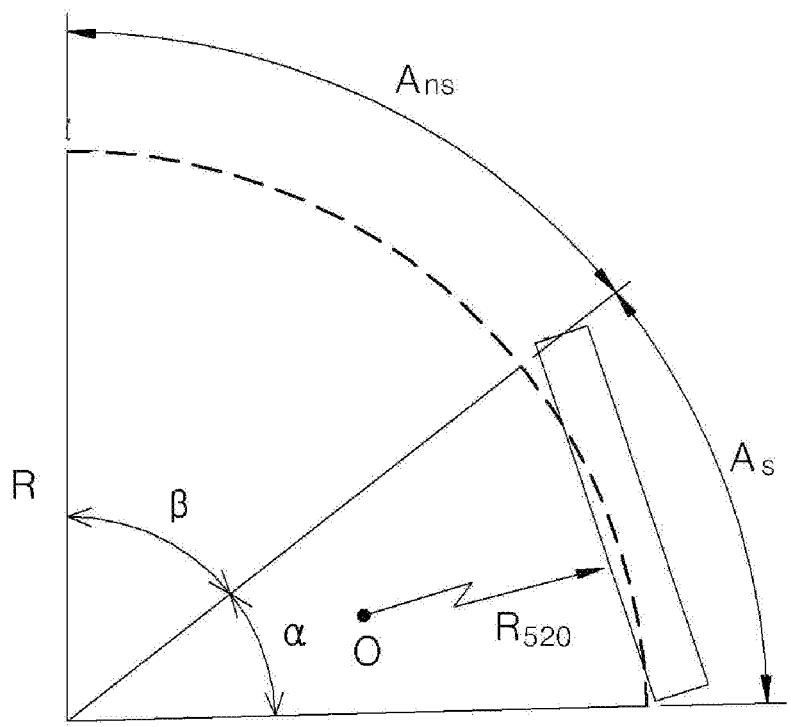
FIGS. 61 and 62 are a partially enlarged top plan view and an output diagram showing the non-uniform arrangement relationship between a shield part by shield ring pieces and a non-shield part of a region where shield ring pieces are not arranged in a torque sensor device according to one embodiment of the present invention.

In other words, as shown in FIG. 61, the shield ring body 510 may take a structure in which it includes a shield region where the shield ring piece 520A is arranged circumferentially, i.e., a shield part $A_s$ that changes the path of a magnetic field, and a shield region as a space defined between two adjacent shield parts $A_s$, i.e., a shield part $A_{ns}$ where the shield ring piece 520A is not arranged circumferentially so as not to change the path of a magnetic field in such a manner that a between angle α formed by the shield part $A_s$ and a between angle β formed by the non-shield part $A_{ns}$ from the center of the shield ring body 510 have different values part and the non-shield part are different from each other.

As such, a torsion detection region, i.e., a linear section enabling the torque measurement through twisting detection can be expanded through the non-equivalent arrangement of an $A_s<A_{ns}$ structure, but not a one-to-one equivalent arrangement between the shield part and the non-shield part, or the width of an output valve as a linear width in the twisting detection section for the same torque measurement can be increased to improve measurement sensitivity.

The between angle α formed by the shield part $A_s$ and the between angle β formed by the non-shield part $A_{ns}$ from the center of the shield ring body 510 of the present invention satisfy the following relationship: β>α, and wherein the length l of an arc formed by the shield part $A_s$ a is written as follows:

$$l = \frac{2\pi R\alpha}{m(\alpha+\beta)},$$

wherein R is a radius of the shield ring body 510, and m is the number of shield ring pieces 520A.

In this embodiment, the shield ring body 510 may take a configuration in which the length of the arc formed by the shield part $A_s$ is written as follows:

$$l > \frac{2\pi R}{3m},$$

so that an output value detected by the torque sensor of the sensing unit is increased to enhance sensitivity through the magnet unit, the shield ring unit on which the shield ring pieces are disposed, and the collector unit. If the length of the arc formed by the shield part $A_s$ is too small, a function of the shield ring piece is lowered, thus leading to a problem of sensitivity degradation. Thus, the length of the arc of the shield part preferably has an appropriate value.

Figure 52:
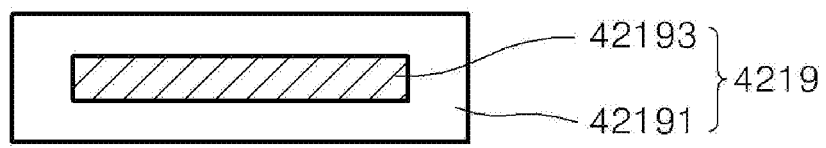
FIGS. 52 to 54 are partial cross-sectional views showing modifications taken along the line D-D of FIG. 51.
Figure 53:
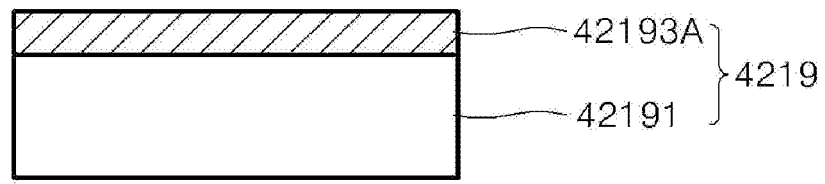
Figure 54:
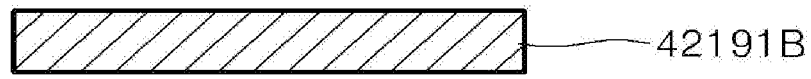
Figure 55:
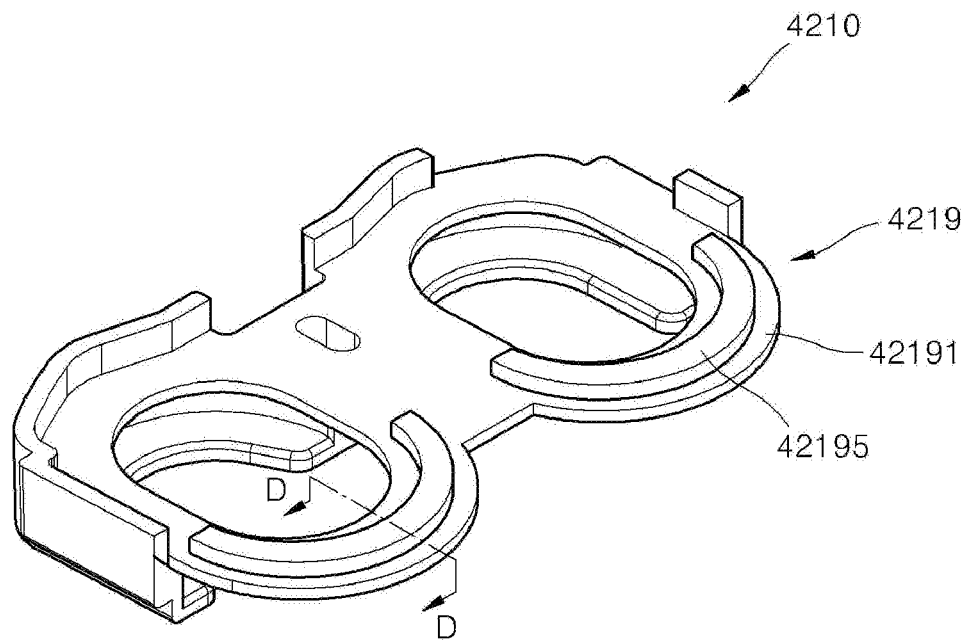
FIGS. 55 and 56 are schematic perspective and partial cross-sectional views showing another modification of an angular holder including an angular holder shield part of a torque sensor device according to one embodiment of the present invention.
Figure 56:
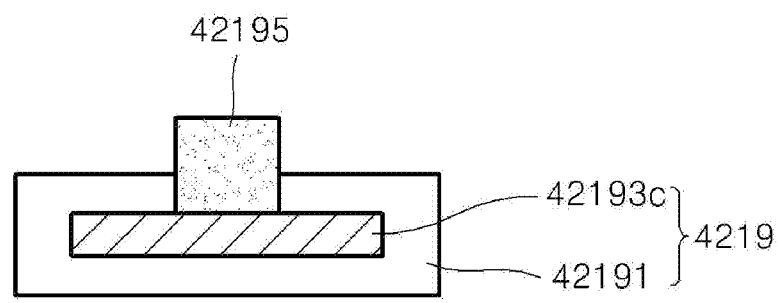
Figure 62:
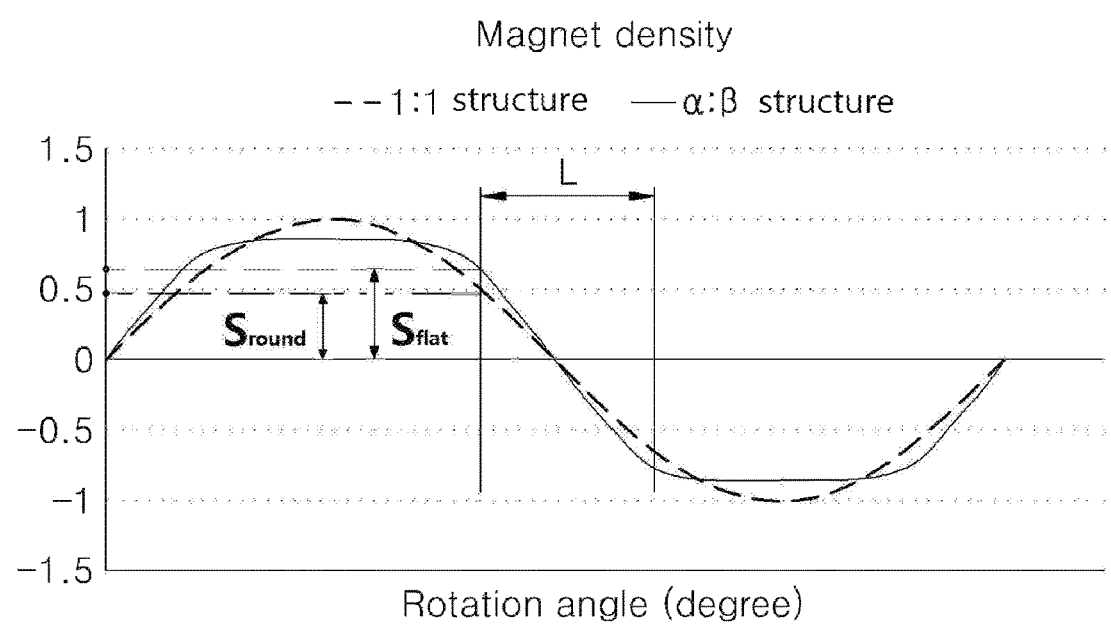

FIG. 62 shows a diagram of a detection output signal of a shield ring piece 520a of a flat piece structure, and a shield ring piece 520 having a predetermined curvature structure in a radial direction of the shield ring body as in the above embodiment of FIG. 52. A signal output value for a rotation angle range is outputted while forming a predetermined waveform. With respect to the same torsion detection range L, the output range of the shield ring piece of a flat piece structure has a value of $2S_{flat}$, and the output range of the shield ring piece of a predetermined curvature structure has a value of $2S_{round}$d, and the following relationship is established: $S_{flat}>S_{round}$. In other words, it can be confirmed that the sensitivity by the shield ring piece 520a of a flat piece structure excellent with respect to the same torsion detection range.

In other words, an asymmetric error for the shield ring piece of a flat piece structure can be reduced remarkably compared to that for the shield ring piece having a predetermined curvature structure.

As such, the shield ring piece can be formed as a flat piece structure to achieve the improvement of sensitivity and errors, and simultaneously exclude a separate rolling process of forming a curvature so that an effect of reducing the process costs can be involved.

As described above, the present invention can be modified in various manners within a range of detecting a torque applied a shaft through a contactless type torque sensor. The present invention can be implemented in various manners within a range of achieving the torque detection of a contactless type, such as being implemented as a torque sensor for an electric bicycle or an electric motorcycle besides a steering wheel shaft for a motor vehicle. In addition, although a description has been made centering on a structure in which the magnet unit is disposed at the input shaft side and the shield ring unit is disposed at the output shaft in the above embodiments, it will be apparent from the present invention that a vice-versa configuration may be implemented.

INDUSTRIAL APPLICABILITY

The present invention is applicable to a variety of industrial fields that perform various torque detections, such as bicycles, electric motors, etc., besides motor vehicles within a range of achieving a contactless type torque detection structure. In other words, the present invention can be utilized in a variety of industrial and technical fields, such as being implemented as a torque sensor for an electric bicycle or an electric motorcycle besides a steering wheel shaft for a motor vehicle within a range of detecting a torque applied a shaft through a contactless type torque sensor.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

The invention claimed is:

1. A torque sensor device disposed between an input shaft and an output shaft and configured to detect a torque between the input shaft and the output shaft through a relative rotation displacement therebetween, the torque sensor device comprising:
   a housing configured to accommodate an end of the input shaft and an end of the output shaft and fixed in position to be able to perform a relative rotation with respect to the input shaft and the output shaft:
   a magnet unit accommodated in the housing and including a magnet ring connected to one end of one of the input shaft and the output shaft so as to be rotatably accommodated in the housing;
   a collector unit fixed in position to the housing in such a manner as to be disposed at the outside of the magnet unit, and configured to focus a magnetic field generated from the magnet unit;
   a sensing unit including a torque sensor disposed at the outer circumference of the collector unit and configured to detect the magnetic field focused by the collector unit; and
   a shield ring unit interposed between the collector unit and the magnet unit in such a manner as to be connected to one end of the other of the input shaft and the output shaft, and configured to change the magnetic field from the magnet unit, which is focused by the collector unit, by means of the relative rotation between the input shaft and the output shaft,
   wherein the shield ring unit comprises:
   a shield ring body disposed inside the collector unit and configured to accommodate the magnet unit therein in a relatively rotatable manner; and
   one or more shield ring pieces arranged on the outer circumference of the shield ring body in such a manner as to be spaced apart from one another at predetermined intervals,
   wherein the shield ring body comprises a shield sleeve provided at one side thereof so as to be connected to one end of the input shaft,
   wherein the shield ring body comprises a shield body, wherein the shield body comprises:
   a shield body rounder connected to the shield sleeve; and
   a shield body holder connected to the shield body rounder to allow the shield ring pieces to be accommodatingly mounted thereon.

2. The torque sensor device according to claim 1, wherein the shield sleeve comprises a sleeve shaft connected to one end of the input shaft and a sleeve peripheral part formed to extend outwardly radially from a lower end of the sleeve shaft, the sleeve peripheral part including one or more plurality of grooves formed along the outer circumferential edge thereof.

3. The torque sensor device according to claim 1, wherein the shield body rounder comprises one or more shield body rounder seating parts to allow one ends of the shield ring pieces to be seated thereon, and
   wherein the shield body holder comprises one or more ring piece through-openings formed thereon, the inner walls of the ring piece through-openings comprising one or more ring piece seating parts formed thereon to seatingly support the other ends of the shield ring pieces.

4. The torque sensor device according to claim 3, wherein each of the shield ring pieces comprises:

a ring piece body disposed at the shield body holder ring piece seating part so as to be substantially perpendicular to a radial direction of the shield ring unit; and
a ring piece connection part disposed to extend inwardly from an end of the ring piece body and seated in the shield body rounder seating part.

5. The torque sensor device according to claim 4 wherein the ring piece connection part comprises a ring piece connection mounting part formed penetratingly thereon, and
   wherein the shield body rounder seating part comprises a seating groove formed on one side thereof to allow the ring piece connection part to be seatingly accommodated therein, and a seating fusion protrusion formed on one side of the seating groove so as to be inserted into the ring piece connection mounting part.

6. The torque sensor device according to claim 4, wherein the shield body holder ring piece seating part comprises a ring piece seating align guide inclinedly formed as a dovetail structure on the inner side of the ring piece through-opening so as to be oriented toward the center axis of the shield body holder.

7. The torque sensor device according to claim 4, wherein the shield body holder ring piece seating part comprises a ring piece seating stopper formed at an end thereof, which is substantially perpendicular to the rotary shaft of the shield body holder to support an end of the shield ring piece.

8. The torque sensor device according to claim 4, wherein the ring piece body comprises a ring piece guide formed on an end thereof, and
   wherein the ring piece seating stopper comprises a ring piece guide counterpart formed on one side thereof so as to be engageable with the ring piece guide.

9. A torque sensor device disposed between an input shaft and an output shaft and configured to detect a torque between the input shaft and the output shaft through a relative rotation displacement therebetween, the torque sensor device comprising:
   a housing configured to accommodate an end of the input shaft and an end of the output shaft and fixed in position to be able to perform a relative rotation with respect to the input shaft and the output shaft:
   a magnet unit accommodated in the housing and including a magnet ring connected to one end of one of the input shaft and the output shaft so as to be rotatably accommodated in the housing;
   a collector unit fixed in position to the housing in such a manner as to be disposed at the outside of the magnet unit, and configured to focus a magnetic field generated from the magnet unit;
   a sensing unit including a torque sensor disposed at the outer circumference of the collector unit and configured to detect the magnetic field focused by the collector unit; and
   a shield ring unit interposed between the collector unit and the magnet unit in such a manner as to be connected to one end of the other of the input shaft and the output shaft, and configured to change the magnetic field from the magnet unit, which is focused by the collector unit, by means of the relative rotation between the input shaft and the output shaft,
   wherein the shield ring unit comprises:
   a shield ring body disposed inside the collector unit and configured to accommodate the magnet unit therein in a relatively rotatable manner; and one or more shield ring pieces arranged on the outer circumference of the shield ring body in such a manner as to be spaced apart from one another at predetermined intervals,
wherein the shield ring unit comprises a shield ring over-body coupled to the shield ring body and configured to fixedly support the shield ring pieces mounted on the shield ring body.

10. The torque sensor device according to claim 9, wherein the shield ring body comprises a shield sleeve provided at one side thereof so as to be connected to one end of the input shaft, the shield sleeve being insert-molded with the shield ring body, and
wherein the shield ring over-body is formed by overmolding an end of the shield ring body on which the shield ring pieces are mounted.

11. The torque sensor device according to claim 1, wherein the sensing unit further comprises an angular sensor module configured to detect a rotation displacement at the output shaft in cooperation with the rotation of the shield ring unit,
wherein the angular sensor module comprises:
an angular sensor disposed so as to be fixed in position to the housing;
an angular magnet disposed at the angular sensor in a relatively rotatable manner;
an angular rotor on which the angular magnet is fixedly mounted; and
an over body angular gear disposed on the shield ring unit that is tooth-engaged with the angular rotor.

12. The torque sensor device according to claim 11, wherein the angular sensor module comprises an angular holder disposed at the housing and configured to guide and support the rotation of the angular rotor, and
wherein the angular holder is opened at one side thereof to allow the angular rotor to be rotatably accommodated therein.

13. The torque sensor device according to claim 12, wherein the angular rotor comprises:
a rotor body on which the angular magnet is mounted;
a rotor gear disposed on the outer circumferential edge of the rotor and tooth-engaged with the over body angular gear; and
a rotor guide formed protrudingly from the rotor body in the longitudinal direction of a rotary shaft of the rotor body.

14. The torque sensor device according to claim 12, wherein the angular rotor comprises:
a rotor body on which the angular magnet is mounted;
a rotor gear disposed on the outer circumferential edge of the rotor and tooth-engaged with the over body angular gear; and
a rotor guide formed protrudingly from the rotor body in the longitudinal direction of a rotary shaft of the rotor body, and
wherein the rotor body comprises a rotor body accommodating part configured to accommodate the angular magnet and including a rotor body accommodating part stopper for preventing the escape of the angular magnet from the rotor body.

15. The torque sensor device according to claim 1, wherein the shield ring pieces are flat pieces.

16. A torque sensor device disposed between an input shaft and an output shaft and configured to detect a torque between the input shaft and the output shaft through a relative rotation displacement therebetween, the torque sensor device comprising:
a housing configured to accommodate an end of the input shaft and an end of the output shaft and fixed in position to be able to perform a relative rotation with respect to the input shaft and the output shaft:
a magnet unit accommodated in the housing and including a magnet ring connected to one end of one of the input shaft and the output shaft so as to be rotatably accommodated in the housing;
a collector unit fixed in position to the housing in such a manner as to be disposed at the outside of the magnet unit, and configured to focus a magnetic field generated from the magnet unit;
a sensing unit including a torque sensor disposed at the outer circumference of the collector unit and configured to detect the magnetic field focused by the collector unit; and
a shield ring unit interposed between the collector unit and the magnet unit in such a manner as to be connected to one end of the other of the input shaft and the output shaft, and configured to change the magnetic field from the magnet unit, which is focused by the collector unit, by means of the relative rotation between the input shaft and the output shaft,
wherein the shield ring unit comprises:
a shield ring body disposed inside the collector unit and configured to accommodate the magnet unit therein in a relatively rotatable manner; and
one or more shield ring pieces arranged on the outer circumference of the shield ring body in such a manner as to be spaced apart from one another at predetermined intervals,
wherein the shield ring pieces are flat pieces,
wherein the shield ring body comprises a shield sleeve provided at one side thereof so as to be connected to one end of the input shaft, wherein the shield ring body comprises a shield body, wherein the shield body comprises: a shield body rounder connected to the shield sleeve; and a shield body holder connected to the shield body rounder to allow the shield ring pieces to be accommodatingly mounted thereon,
wherein the shield body rounder comprises one or more shield body rounder seating parts to allow one ends of the shield ring pieces to be seated thereon, and wherein the shield body holder comprises one or more ring piece through-openings formed thereon, each of the inner walls of the ring piece through-openings comprising a ring piece seating part formed thereon to seatingly support the other ends of the shield ring pieces, and
wherein each of the shield ring pieces comprises: a ring piece body disposed at a shield body holder ring piece seating part so as to be substantially perpendicular to a radial direction of the shield ring unit; and a ring piece connection part disposed to extend inwardly from an end of the ring piece body and seated in the shield body rounder seating part, wherein the ring piece body has an infinite radius of curvature.

17. The torque sensor device according to claim 16, wherein the shield ring body comprises a shield part where the shield ring piece is arranged radially, and a shield part as a space defined between two adjacent shield parts in such a manner that a between angle α formed by the shield part and a between angle β formed by the non-shield part from the center of the shield ring body have different values.

18. The torque sensor device according to claim 17, wherein the between angle α formed by the shield part and the between angle β formed by the non-shield part from the center of the shield ring body of the present invention satisfy the following relationship: β>α, and wherein the length l of an arc formed by the shield part is written as follows:

$$l = \frac{2\pi R\alpha}{m(\alpha + \beta)},$$

wherein R is a radius of the shield ring body, and m is the number of shield ring pieces.

* * * * *